(12) United States Patent
Anderson et al.

(10) Patent No.: US 7,984,548 B2
(45) Date of Patent: Jul. 26, 2011

(54) METHOD FOR MODIFYING A COMPRESSOR STATOR VANE

(75) Inventors: Rodger O. Anderson, Scotia, NY (US); Fred T. Willett, Burnt Hill, NY (US)

(73) Assignee: DRS Power Technology Inc., Schenectady, NY (US)

( * ) Notice: Subject to any disclaimer, the term of this patent is extended or adjusted under 35 U.S.C. 154(b) by 904 days.

(21) Appl. No.: 11/931,164

(22) Filed: Oct. 31, 2007

(65) Prior Publication Data

US 2008/0282541 A1    Nov. 20, 2008

Related U.S. Application Data

(60) Division of application No. 11/108,278, filed on Apr. 18, 2005, now Pat. No. 7,651,319, which is a continuation-in-part of application No. 10/373,664, filed on Feb. 24, 2003, now Pat. No. 6,984,108.

(60) Provisional application No. 60/358,931, filed on Feb. 22, 2002.

(51) Int. Cl.
  *B21K 21/16* (2006.01)
  *B21K 25/00* (2006.01)
  *F04D 29/44* (2006.01)
(52) U.S. Cl. .................. 29/889.21; 29/401.1; 415/209.3
(58) Field of Classification Search .................. 29/281.5, 29/281.6, 464, 888.025, 889.21, 889.1, 401.1; 415/191, 208.1, 208.2, 209.1, 209.3, 209.4, 415/210.1
See application file for complete search history.

(56) References Cited

U.S. PATENT DOCUMENTS

| | | | |
|---|---|---|---|
| 1,953,089 A * | 4/1934 | Small et al. | 416/196 R |
| 2,812,159 A | 11/1957 | Krebs | |
| 3,781,125 A | 12/1973 | Rahaim et al. | |
| 3,867,066 A | 2/1975 | Canova et al. | |
| 4,072,452 A | 2/1978 | Sheth | |
| 4,685,286 A | 8/1987 | Hetzer et al. | |
| 4,909,708 A | 3/1990 | Albrecht | |
| 5,022,818 A * | 6/1991 | Scalzo | 415/209.3 |
| 5,211,407 A | 5/1993 | Glynn et al. | |
| 5,215,432 A | 6/1993 | Pickering et al. | |
| 5,215,442 A | 6/1993 | Steckle et al. | |
| 5,257,909 A | 11/1993 | Glynn et al. | |
| 5,399,069 A * | 3/1995 | Marey et al. | 415/209.3 |
| 5,411,370 A | 5/1995 | Varsik | |
| 5,569,019 A | 10/1996 | Katariya et al. | |
| 5,690,469 A | 11/1997 | Deal et al. | |
| 5,797,725 A | 8/1998 | Rhodes | |
| 6,102,664 A | 8/2000 | Nguyen | |
| 6,173,491 B1 | 1/2001 | Goodwater et al. | |
| 6,209,198 B1 | 4/2001 | Lammas et al. | |
| 6,290,459 B1 | 9/2001 | Correia | |
| 6,343,912 B1 | 2/2002 | Manteiga et al. | |
| 6,409,472 B1 | 6/2002 | McMahon et al. | |

(Continued)

*Primary Examiner* — David P Bryant
*Assistant Examiner* — Alexander P Taousakis
(74) *Attorney, Agent, or Firm* — SNR Denton US LLP

(57) ABSTRACT

A vane unit system having a plurality of vane units having at least one airfoil projecting from a base is modified by placing a hole in the base and receiving a pin which extends between adjacent bases of vane units. A series of modified bases form a rigid ring of vanes that are less susceptible to vane motion caused by pressure fluctuations within the compressor of a gas turbine. A blade assembly tool having a shape to fit within the slit in a casing that receives the vane units allows for the installation of vane units with interlocking pins without the necessity of having to remove the rotor from the casing.

9 Claims, 28 Drawing Sheets

U.S. PATENT DOCUMENTS

| | | |
|---|---|---|
| 6,537,022 B1 | 3/2003 | Housley et al. |
| 6,984,108 B2 | 1/2006 | Anderson et al. |
| 2002/0085913 A1 | 7/2002 | Bos |
| 2002/0121082 A1 | 9/2002 | Hashimoto et al. |

* cited by examiner

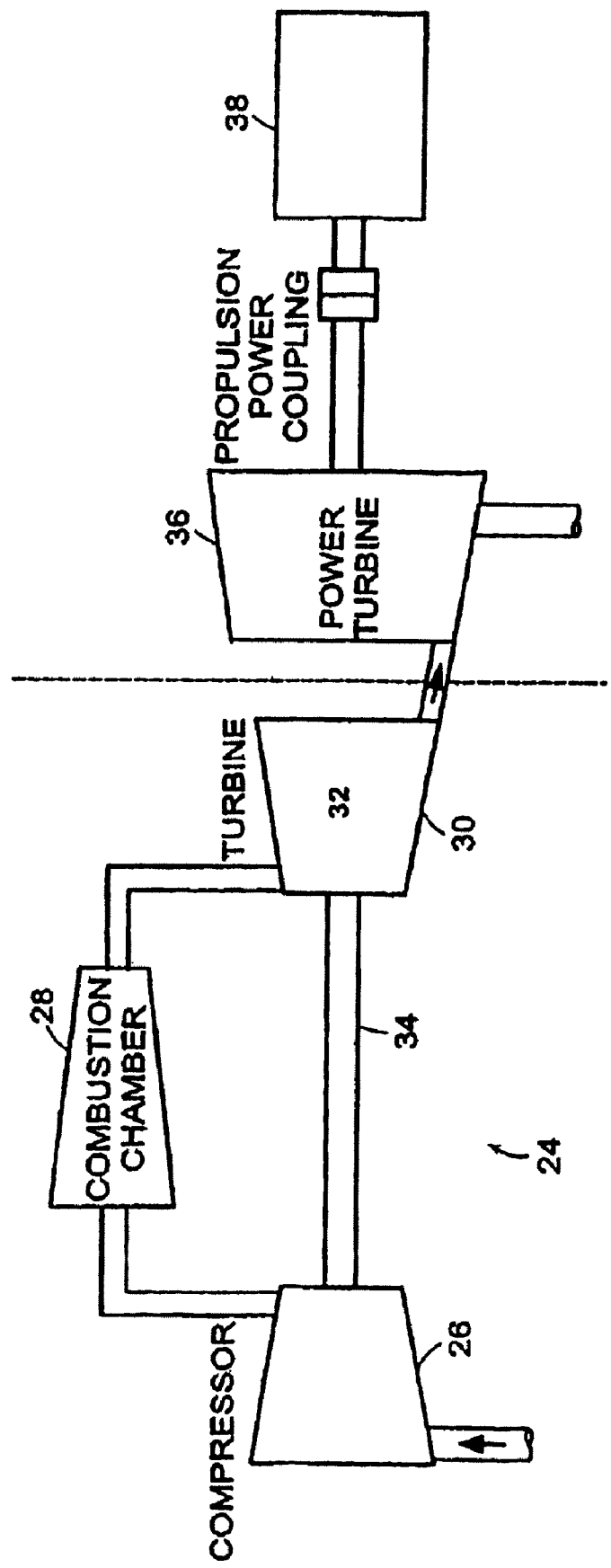

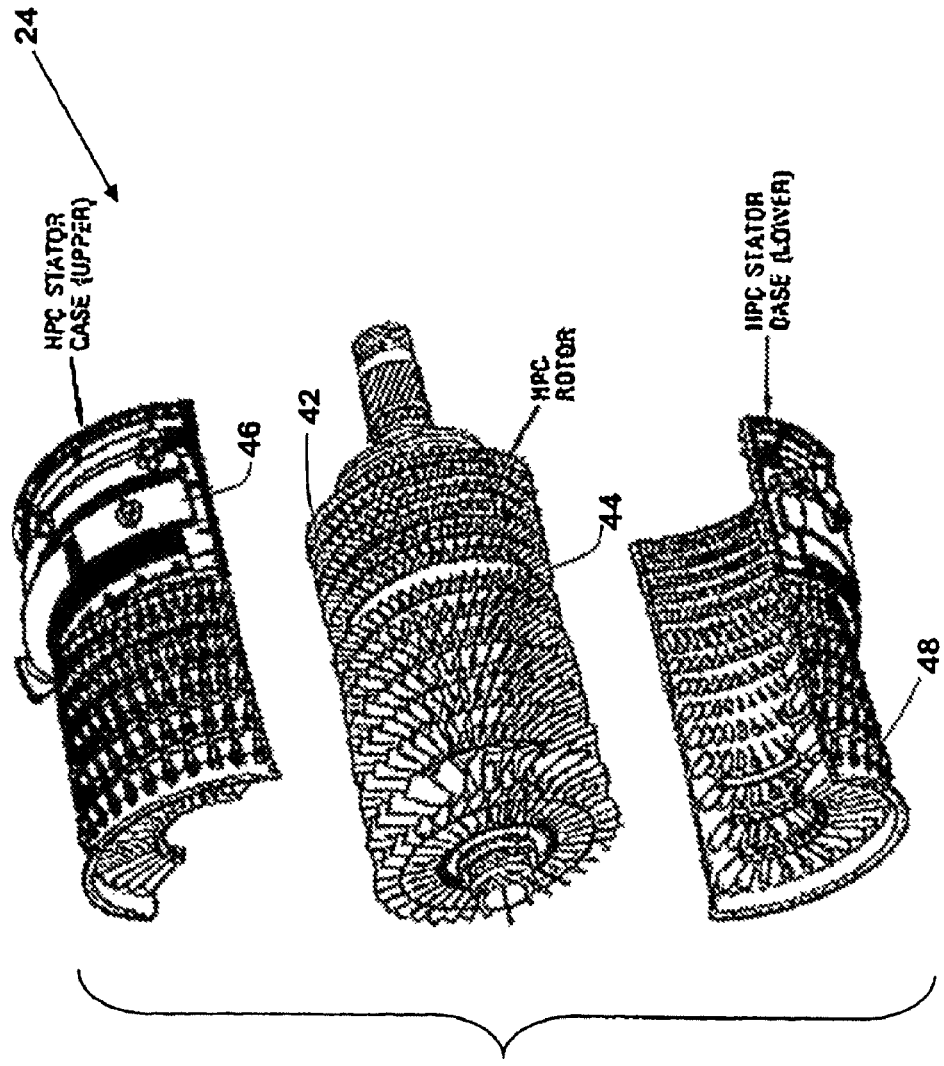

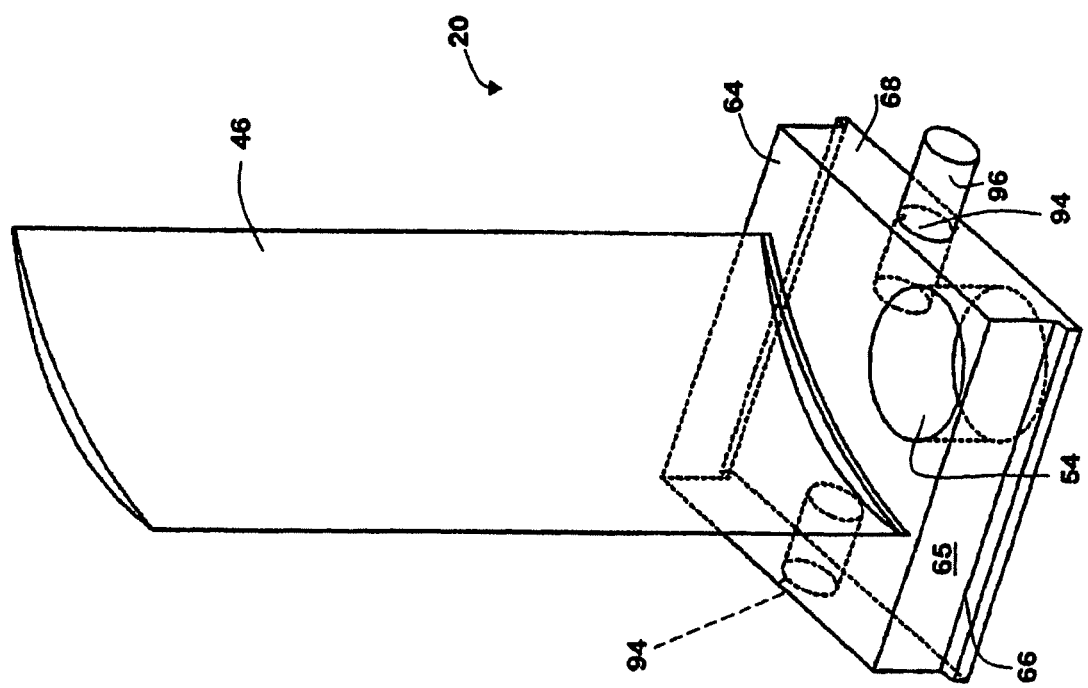

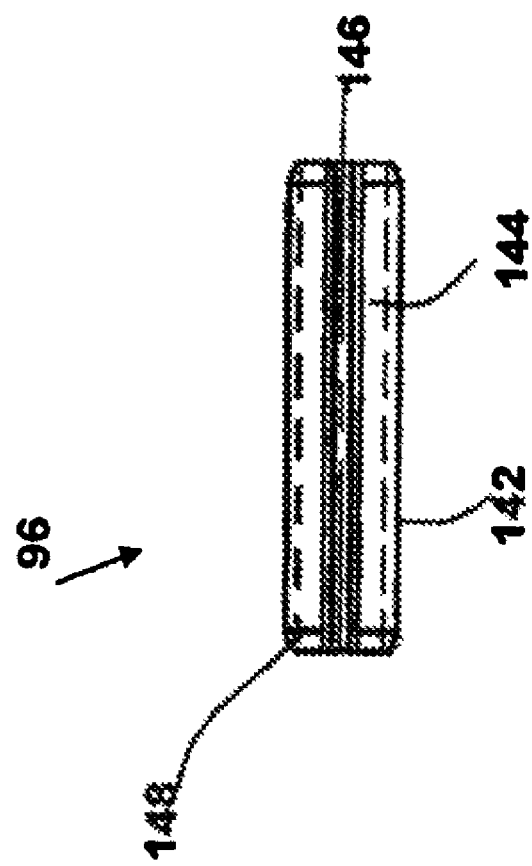

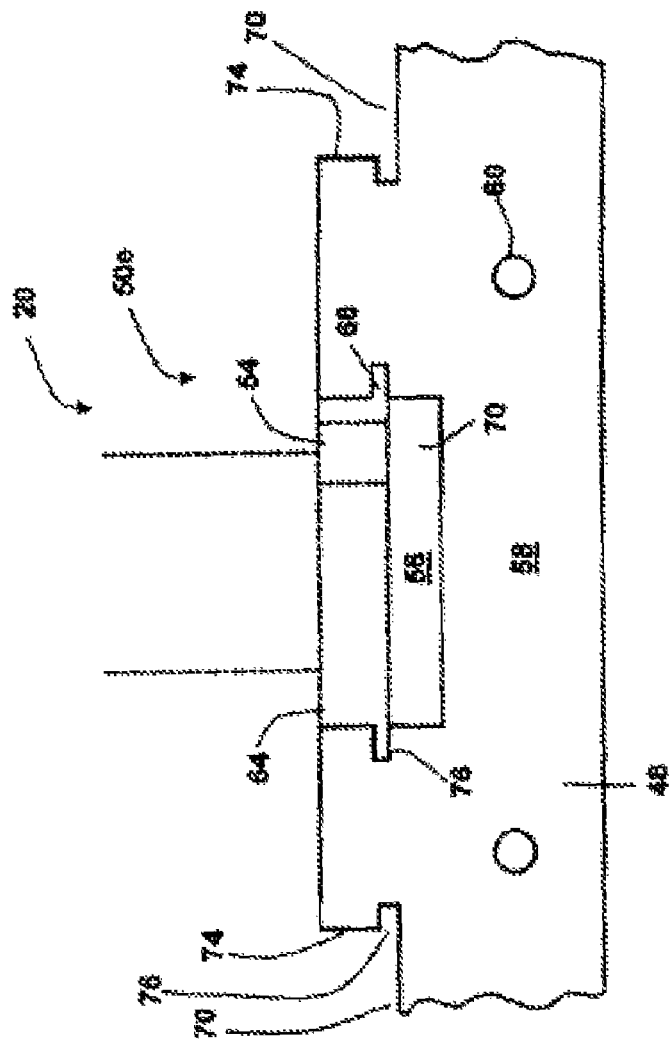

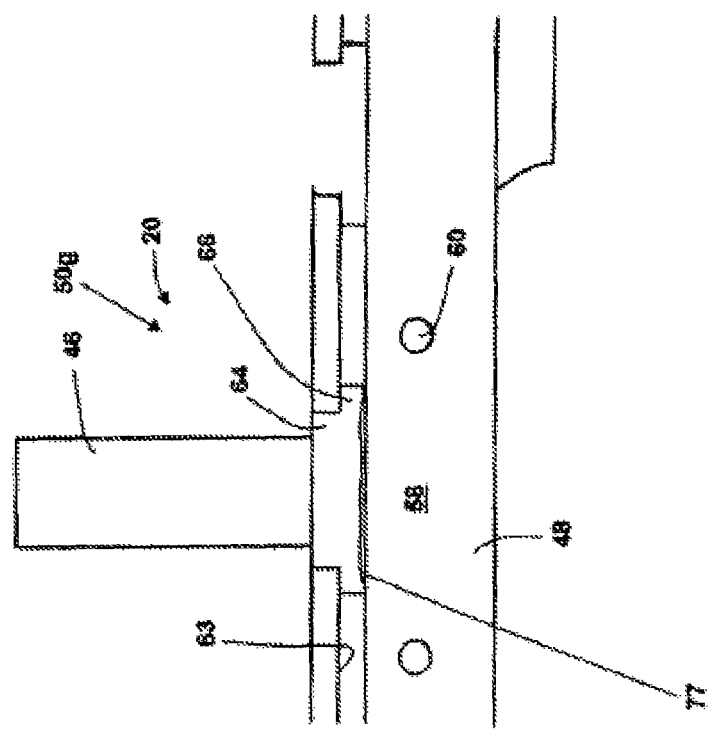

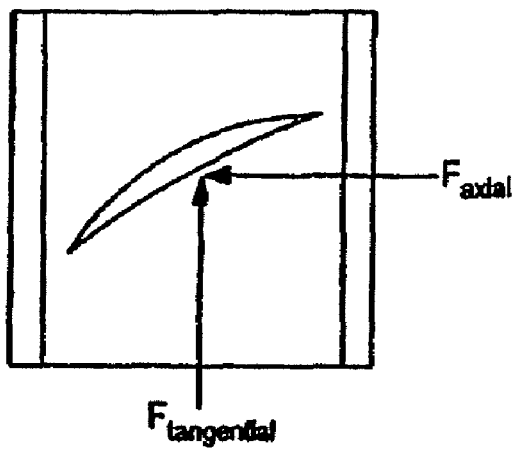
FIG. 15A
PRIOR ART
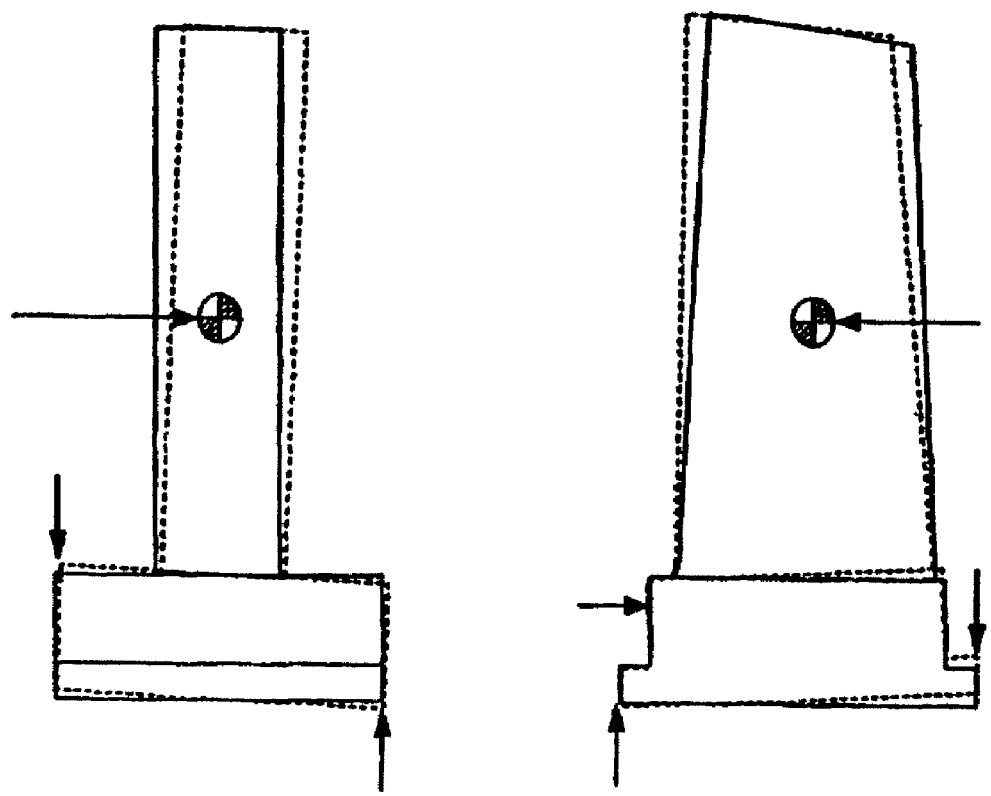
FIG. 15B
PRIOR ART
FIG. 15C
PRIOR ART

PRIOR ART

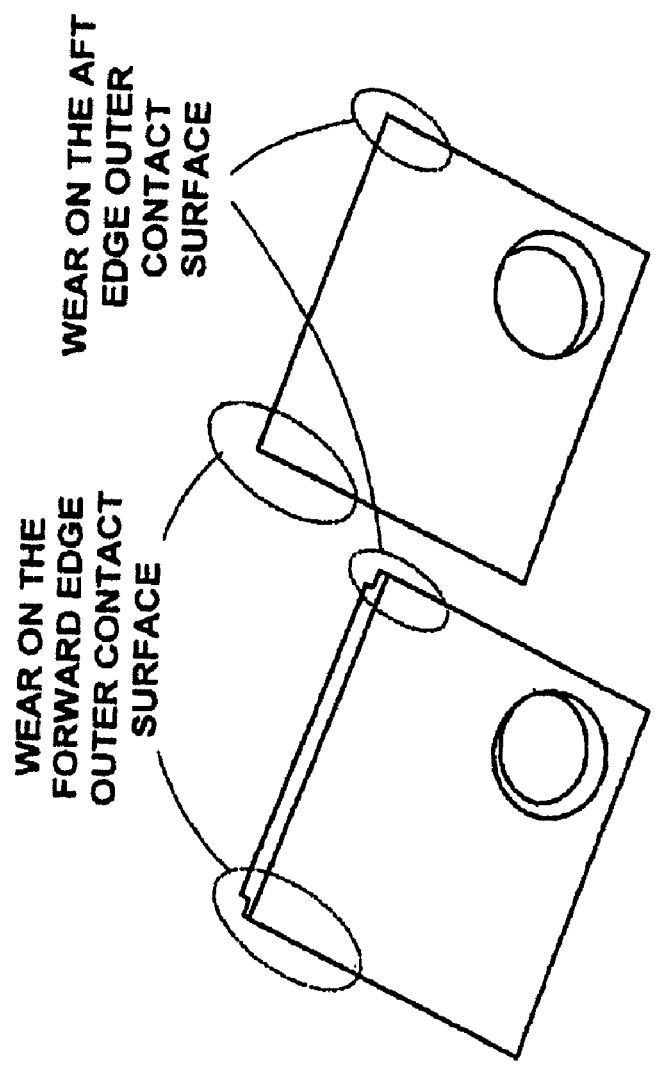

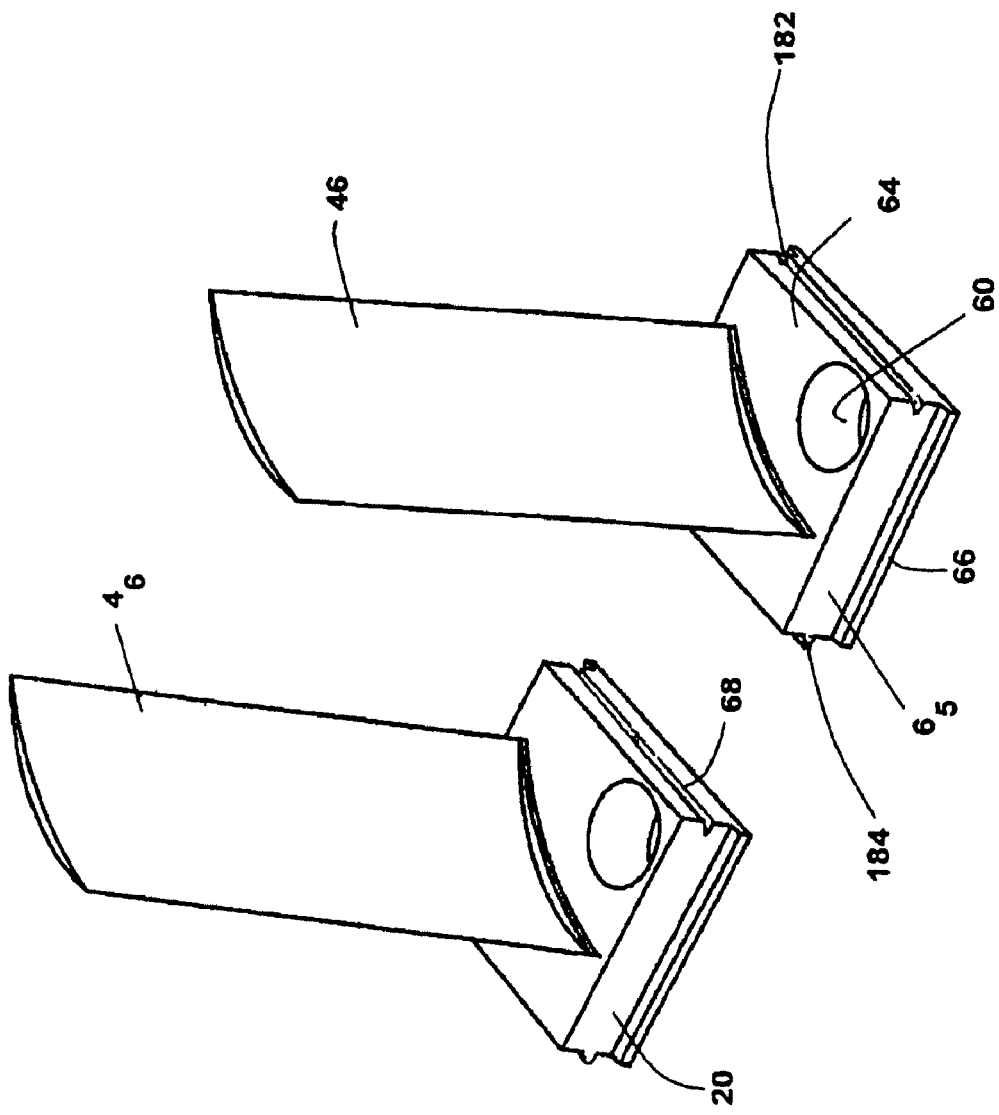

US 7,984,548 B2

METHOD FOR MODIFYING A COMPRESSOR STATOR VANE

CROSS-REFERENCE TO RELATED APPLICATIONS

This application is a division of U.S. application Ser. No. 11/108,278 filed Apr. 18, 2005, which is a continuation-in-part of U.S. application Ser. No. 10/373,664 filed Feb. 24, 2003, that claims the benefit of U.S. Provisional Application No. 60/358,931 filed Feb. 22, 2002, the contents of which are incorporated herein by reference.

BACKGROUND OF THE INVENTION

Compressor stator vanes in an industrial gas turbine are loaded and unloaded during start-stop cycles. In addition, the vanes are subject to small pressure fluctuations during operation. These result in relative motion between the vane base and the casing in which the vanes are assembled. The relative motion results in wear of both the vane base and casing, which, in turn, results in loose vanes. An example of the wear pattern on the base of a vane unit and in particular on a projection on the contact surface is shown in FIGS. 17A and 17B. The loose vanes become more susceptible to relative motion and begin to chatter. Expensive repair or replacement of the vanes and case does not solve the wear and chatter problem; it simply begins the process anew. Repair and/or replacement of the vanes and casing is expensive.

SUMMARY OF THE INVENTION

The present invention overcomes the above-mentioned disadvantages by providing a method and apparatus for repairing worn components of turbine compressors without complete replacement. The invention also provides improved method and apparatus for improving airfoil stability in known configurations of compressors.

This invention relates generally to repairing compressor vane arrangements having worn parts in a compressor casing having at least one slot receiving the parts. The slot usually has a pair of side edges wherein each side edge has a groove. A plurality of vane units each have a base and an airfoil vane projecting from the base.

In a preferred embodiment, the base is provided with at least one, but preferably a pair of holes, so as to face at least one, but preferably both adjacent vanes in ring. A pin extends between the holes in adjacent bases of the vane units for forming a ring of rigidly mounted vanes with a plurality of vane units.

In another embodiment, at least one shim is interposed between a pair of adjacent vane units, the shim having a hole through which the pin extends as it is positioned between the adjacent vane units.

In another embodiment, the pin is a slotted spring pin having a hollow cylindrical tube having a longitudinal slot, although other pin shapes are also within the scope of the invention. The cylindrical tube may have chamfered ends.

A compressor usually has a rotor having a plurality of blades and a casing for encircling the rotor. The casing may have at least one slot for retaining a plurality of vanes, but may include many such slots. Each vane unit has a base and at least one airfoil vane projecting from the base. The repair method and apparatus may include a coupling device that extends between adjacent bodies, for example bases for forming a ring unit from a plurality of vane units to stiffen the airfoil vanes.

In one embodiment, the coupling device is at least one pin extending between holes in adjacent bases. The pin may be a slotted spring pin having a hollow cylindrical tube having a longitudinal slot when resiliency and frictional engagement with the bases is desired. In another embodiment, the coupling device is a projection on one base received by a hole on the adjacent base. In still other embodiments, the coupling device may be a groove on one vane unit for receiving a tongue on an adjacent vane unit or other adjacent body.

A repair kit for repairing a compressor may include a device for placing a hole in a base of a vane unit, a device for inserting a pin into the hole of the base, and a blade assembly tool for positioning and connecting adjacent vane units. Accordingly, a method embodiment may include placing a hole in the base, inserting a pin and positioning adjacent vane units. The units may be connected for forming a ring unit or for resisting displacement with respect to an adjacent body such as a shim. A modified method embodiment includes placing a hole in the base, placing a shim adjacent the vane, inserting a pin and positioning an adjacent vane unit. The shim may be provided with an opening positioned to align with the hole and receive the pin. The pin may resiliently engage a vane and a shim or both vanes and the shim.

A blade assembly tool embodiment has a main portion having a pair of face edges and a pair of side edges. The main portion has a curvature and a width for receipt of the pair of side edges by a slot in a casing. The tool has a pair of contact blocks. Each contact block is secured to one of the face edges.

In one embodiment, the contact blocks have a width for fitting between a pair of side walls of the slot. The main portion has a pair of holes and a series of scribe lines.

One embodiment of a method of repairing at least one loose stator vane includes the step of securing at least one vane unit to another vane unit for stiffening the vane units.

In another embodiment, the method includes securing at least one vane unit to another vane unit by connecting the plurality of vane units to each other by a plurality of pins.

In another embodiment, the base of the vane unit has a base having a pair of mounting surfaces and a pair of engaging surfaces. A hole may be drilled in at least one of the engaging surfaces for receiving one of the pins for connecting to another engaging surface of another vane unit.

Another embodiment of a method of repairing of a compressor further includes the step of removing the existing vane units from the casing of the compressor. The holes may be drilled into the base of the vane units while they are removed from the casing.

Another embodiment of a method of repairing a compressor includes the step of positioning a vane unit at the dead center of the casing. At least one assembly tool is slid in the slot by placing the edges of the assembly tool in the grooves in the slot. The tool engages the vane unit with the contact block for maintaining position as the second vane unit with a pin projecting from the engaging side of the base is slid into the slot with the projection of the mounting edge received by the groove in the slot. The pin may be driven into the hole on the engaging edge of the base of the first vane unit by sliding at least one assembly tool in the slot by placing the edges of the assembly tool in the grooves in the slot and engaging the vane unit with the contact block and driving the second vane unit towards the first vane unit.

An embodiment of the method of repairing a compressor further includes removing of the assembly tool in engagement with the second vane unit. Another vane unit with a pin projecting from the engaging side of the base or adjacent body such as a shim may be slid into the slot with the projection of the mounting edge received by the groove in the slot. The pin may be driven into the hole on the engaging edge of the base of the previous vane unit by sliding at least one assembly tool in the slot by placing the edges of the assembly tool in the grooves in the slot and engaging the vane unit with the contact block and driving another vane unit towards the previous vane unit. The process may be repeated until the vane units or combination of vane units and shims fill the slot in the casing.

Another embodiment of the method of repairing a compressor also includes the step of interposing at least one shim between adjacent bodies or vane units for positioning one of the engaging edges of a vane unit flush with the edge of the casing.

Another compressor section has a rotor having a plurality of blades and a casing for encircling the rotor with a plurality of vane units each having a base and at least one airfoil vane projecting from the base. The casing has at least one slot for retaining the vanes and an air extraction slot. The air extraction slot underlies the slot and defines a casing hook. A coupling device extends between adjacent bases or bodies for rigidly positioning the bodies for forming a ring unit from a plurality of vane units to stiffen the airfoil vane mounting. At least one bracket may be carried by one vane unit engaging the casing hook.

In one embodiment, a coupling device is at least one pin extending between holes in adjacent bases. The pin may be a slotted spring pin having a hollow cylindrical tube having a longitudinal slot when tangential pressure load on the vane may be opposed by the pin. The cylindrical tube may have chamfered ends.

In another embodiment, the bracket is secured by a fastener extending through the casing and to the base of the vane unit.

A stator vane system embodiment of the invention may have a casing having a curved inner surface and a pair of joint surfaces for mounting with at least another casing for encircling a rotor of a compressor. The casing has at least one slot. The slot extends from one joint surface edge to the other joint surface. The slot has a bottom and a pair of side edges. Each side edge has a groove extending from one joint surface to the other joint surface and can include an air extraction slot. The air extraction slot underlies the slot and defines casing hook joint surface.

A plurality of vane units each have a base and an airfoil vane projecting from the base. The base has a pair of mounting sides opposite each other and each having a projection receivable by the groove in the slot for retaining the vane unit, and a pair of engaging edges opposite each other for engaging adjacent vane units. Each vane unit may have a hole in each engaging edge. A pin extends between the holes in adjacent bases of the units and may resiliently engage adjacent bodies or shims for damping the movement of the vane. In a preferred embodiment, a bracket is carried by one of the vane units.

The invention provides the advantages of modifying a set of compressor stator vanes for an industrial gas turbine so as to avoid the effects of wear of the vane base and reduce chatter. The vanes may be joined by a simple mechanical means such that the discrete vanes may form a rigid ring of vanes and are less susceptible to individual vane motion caused by pressure fluctuations.

The vanes, according to the invention, result in changing the reaction points on the vane base. The relative motion between the vane base and the supporting case is greatly reduced.

The vane units in a preferred embodiment can be installed into existing gas turbines using prior art vanes during the gas turbine overhaul cycle. The vane units modified according to the invention require less repair and/or replacement of the vanes and/or the casing than the prior art vanes.

The invention changes the load distribution on the vane base without altering the fit or function of the vane. The vanes may be connected, preferably by use of a resiliently retained pin, so that the tangential pressure load on the vane is opposed by the spring pin and does not cause tangential displacement of the vane base. The vanes may be connected, for example to shims or to vanes, such that they form a ring of rigid vanes, or a rigid ring and do not move relative to one another when acted upon by pressure fluctuations. The frictional force produced by the spring pin may act in opposition to the axial gas load and prevents, or at least reduces, axial motion of the vane.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1A is a schematic of a gas turbine;

FIG. 1B is a exploded perspective view of a compressor section of the gas turbine;

FIG. 4A is a perspective view of a vane unit modified according to an embodiment of this invention;

FIG. 4B is a plan view of a spring pin that may be used according to the present invention;

FIG. 5A is an enlarged view of the edge of the casing showing a previously known compressor fifth stage that may benefit from being modified according to the present invention;

FIG. 5B is an enlarged view of the edge of a previously known casing showing compressor's seventh stage that may benefit from being modified according to an embodiment of the present invention;

FIGS. 15A-15C are top, front, and side views of a prior art vane unit showing the reaction forces;

FIGS. 17A and 17B are front views and bottom views of a prior art vane unit;

FIG. 21 is an exploded view of a pair of vane units with a tongue and groove embodiment according to the present invention.

DETAILED DESCRIPTION OF THE EMBODIMENTS

Figure 2:
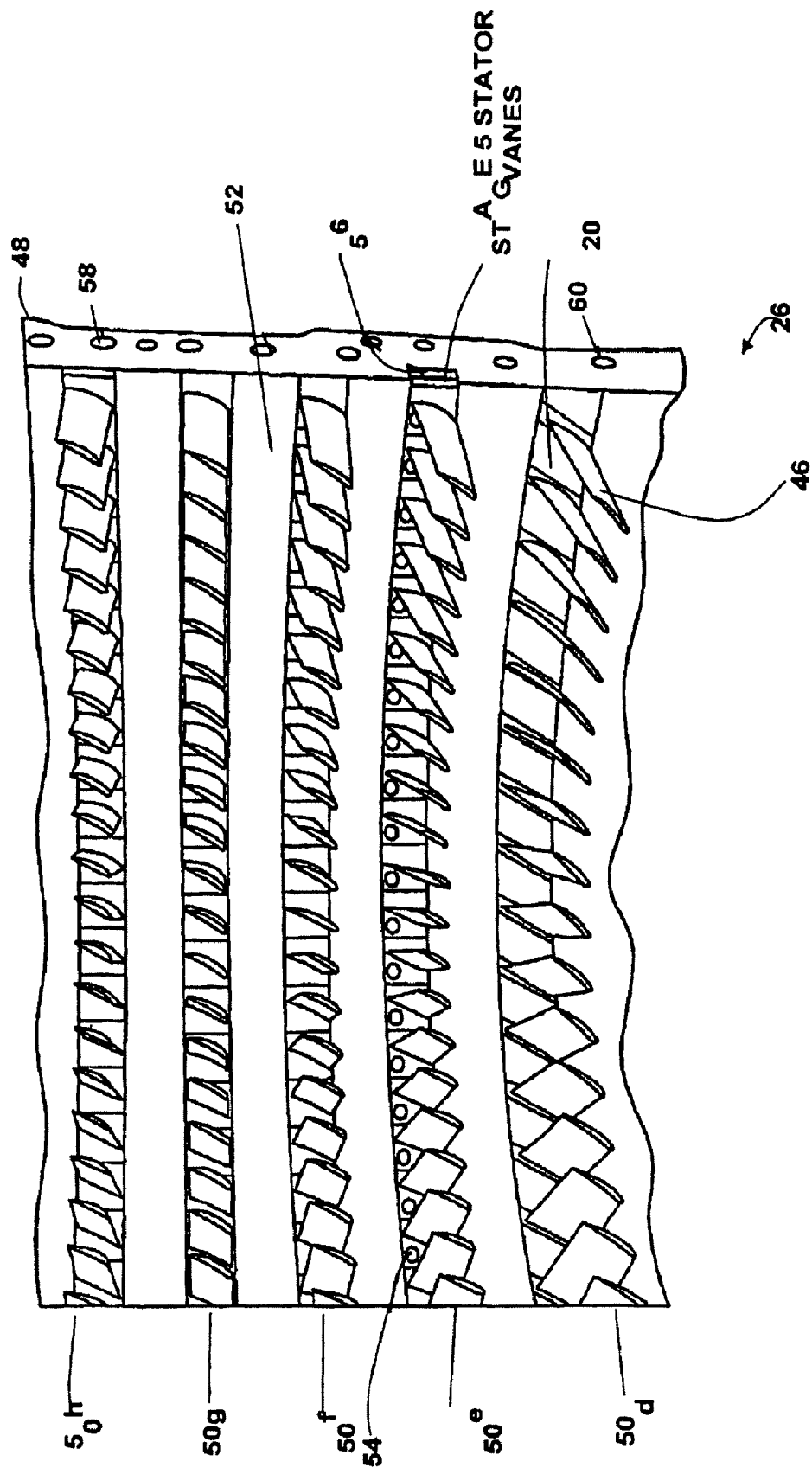
FIG. 2 is a front view of a plurality of compressor stator vanes assembled in the casing.

Referring to the drawings in detail, where like numerals indicate like elements, there is illustrated a vane system including modifications and embodiments for a vane unit in accordance with the present invention designated generally as 20.

Gas turbines are used in various locations such as aircraft, ships, and in power plants. Referring to FIG. 1A a schematic of a gas turbine 24 is shown. The turbine 24 has a compressor section 26 that compresses atmospheric air prior to the air being mixed and combusted with a fuel, i.e., gas, in a combustion chamber 28.

The turbine 24 has a turbine section 30 that converts the energy of the compressed heated air to rotation energy. The turbine section 30 is tailored differently depending on the purpose of the turbine. In a power plant scenario, the turbine section 30 of the gas turbine 24 has two portions. One portion 32 drives a shaft 34 to the compressor section 26 and the second portion is a power turbine 36 for driving a generator 38.

Referring to FIG. 1B, the compressor section 26 of the turbine 24 has a rotor 42 that is driven, rotated, by the shaft 34 that is typically driven by the turbine section 30 of the gas turbine 24, as seen in FIG. 1A. The rotor 42 has a plurality of blades or vanes 44. Interposed between the rotating blades 44 are stator blades or vanes 46 which are retained by a casing or housing 48 of the compressor section 26 of the gas turbine 24. In keeping with the convention of the industry, the air foils on the rotor 42 are referred to as rotating blades 44 or blades 44 and the air foils on the casing 48 are referred to as stator vanes 46 or vanes 46.

As the shaft 34 rotates, the air is compressed as it moves through various stages of the compressor 26 with the blades 44 and the vanes directing the air. The movement of the air places resulting forces on the rotor blades 44 and vanes 46. These forces cause relative motion between the blades 44 and the casing 48 that retains the vanes 46.

In that the blades 44 on the rotor 42 in the embodiment described are rotating in a range of 3000 to 6000 rotations per minute (RPM), the rotation of the rotor 42 creates a centrifugal force on the blades therein preventing movement. Therefore, the vane system 22 is not necessary with the rotor 42. It is recognized that other rotors rotate at other ranges including at higher ranges.

Referring to FIG. 2, a view of a portion of the casing 48 of the compressor section 26 is shown. The casing 48 is formed of at least two semi-circular portions that are fitted together to encircle the rotor 42 shown in FIG. 1B. In the embodiment shown, the casing 48 is semi-circular or 180 degree in curvature. Two units encircle the rotor 42. Referring back to FIG. 2, the casing 48 has a plurality of stages 50 or rows of stator vanes 46. The vane unit 20 has vane or airfoil 46 that projects from the inner surface 52 of the casing 48.

Still referring to FIG. 2, the fourth through eighth stage, 50d-50h, of the stator vanes are shown. In conventional compressors, there is a different method of attaching stage 1-4, 50a-50d, to the housing 48 than that of stage 5, 50e, and higher stages, as discussed below. It is recognized that the style of the stages varies from gas turbine 24 to gas turbine 24.

As seen in FIG. 2 located in proximity to each of the fifth stage 50e stator vanes 46 is a hole 54 to allow air to be drawn from the compressor section 26 through an air extraction cavity 56 to bearing seals. The stages 50 are referred to both as ordinal number stage or stage cardinal number (i.e., fifth stage or stage five).

The casing 48 has a mounting edge 58, also referred to as a joint surface, that is secured to a mounting edge 58 on another section of casing with fasteners extending through a plurality of holes 60 found on the edge 58. The spacing of holes 60 are based on various features and may result in unevenly spaced holes.

Figure 3:
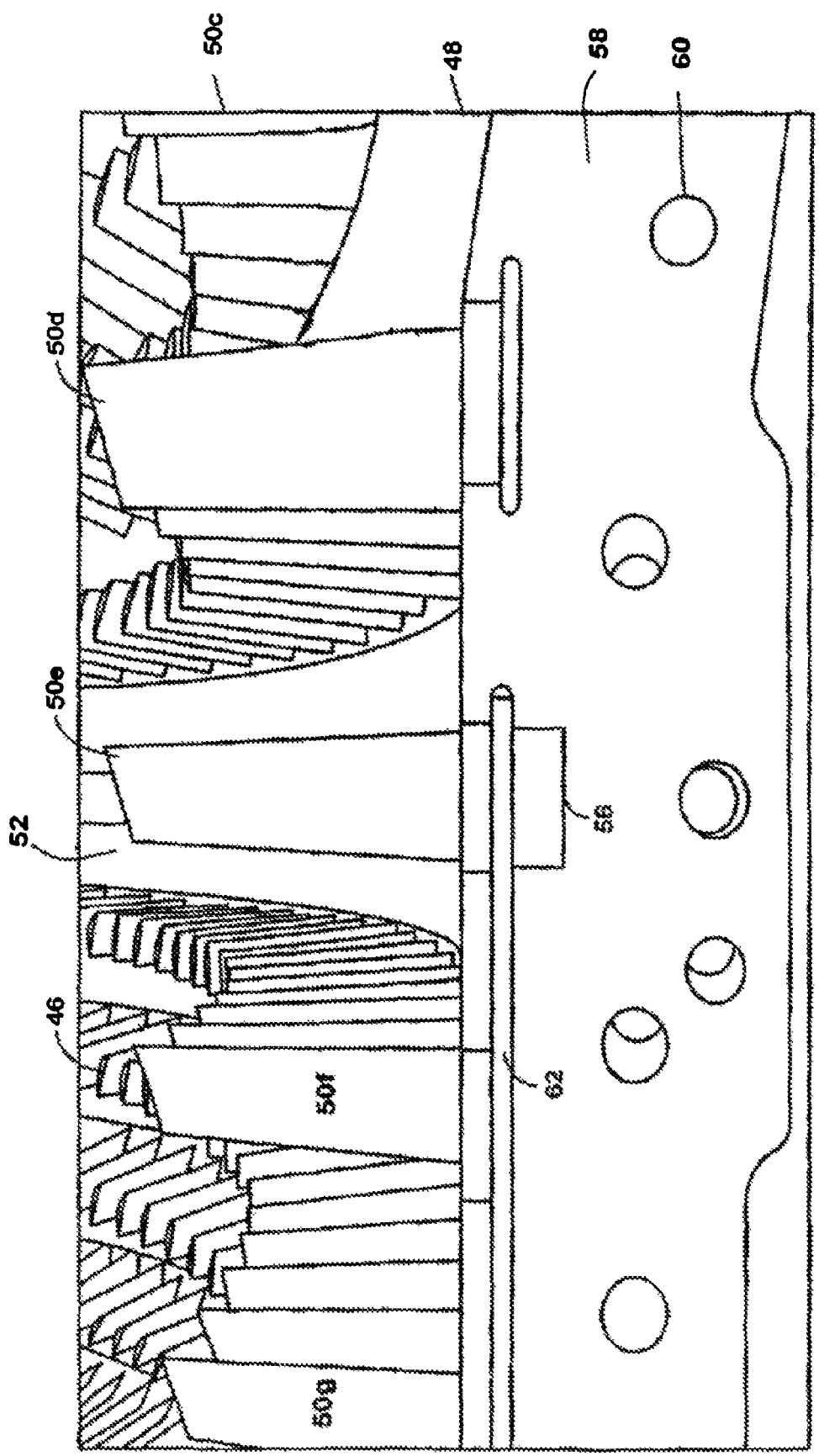
FIG. 3 is a side view of the casing.
Figure 5C:
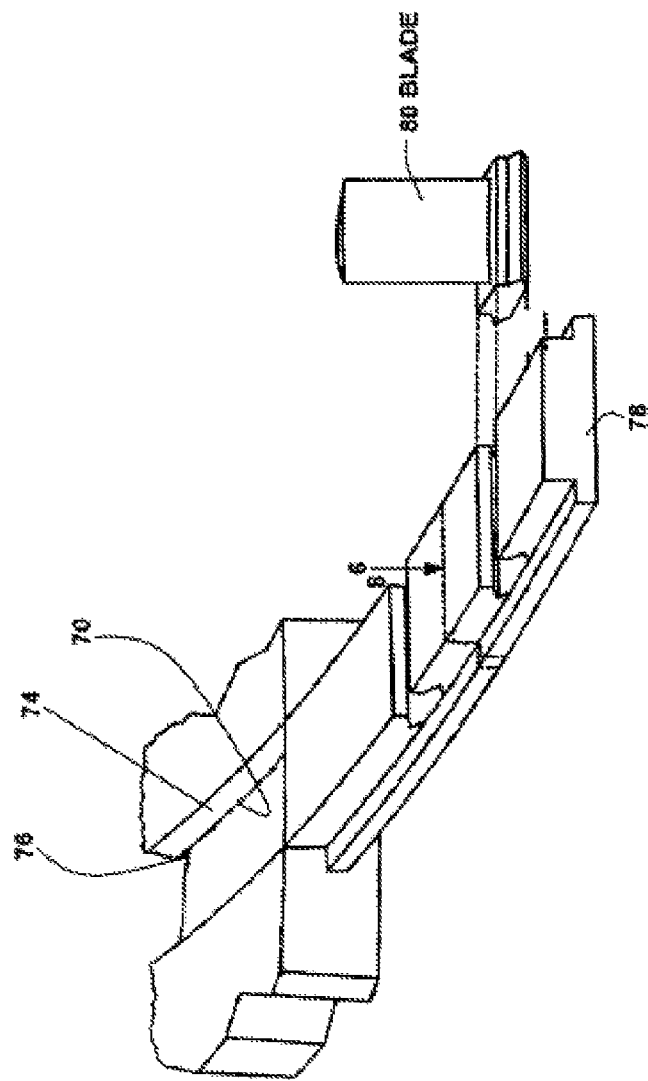
FIG. 5C is an enlarged view of the previously known compressor fourth stage that may benefit from being modified according to an embodiment of the present invention.

FIG. 3 shows the mounting edge 58 of the upper half casing 48 and a portion of the inner surface 52 of the casing 48. The third through the seventh stages 50c-50g, stator vanes 46 are shown. A locking bar 62, which is received in a groove 63 as shown in FIGS. 3 and 5B, is used to secure the stator vanes 46 in stages 5-7. The air extraction cavity 56 is shown below the stage 5 stator vanes 46. As seen in FIG. 2, holes 54 are located near the fifth stage stator vanes 46 for drawing air into the air extraction cavity 56. The fourth stage 50d, which is shown to the right of the fifth stage 50e in FIG. 3, is secured by using a ring and locking method as described below with respect to FIG. 5C.

In the embodiment shown, the vanes 46 for the fifth stage and higher stages in the compressor section 26 are secured to the casing 48 by each vane 46 being part of the section compressor vane unit 20. The compressor vane unit 20, as seen in FIG. 4A, has a base 64 from which the airfoil or the vane 46 projects. The base 64 has a pair of mounting edges 65 that are opposite each other and a pair of engaging edges 68 for engaging adjacent bases of vane units 20.

The base 64 of the vane unit 20 has a pair of projections 66 for securing to the casing 48 as discussed below. The projection 66 extends from each of the mounting edges 65. For those vane units 20 that are for the fifth stage 50e, the base 64 has the hole 54 for drawing air into the air extraction cavity 58. It is recognized that while each stage is similarly constructed, the individual compressor vane units 20 are sized for the respective stage and for factors such as curvature, clearance length, and width.

FIG. 5A illustrates an enlarged side view of the casing 48 showing the fifth stage 50e. A plurality of the compressor vane units 20 are assembled in the casing 48 to form the stator vane stage, as seen in FIG. 3. The casing 48 has a plurality of slots 70 for receiving the vane units 20. The slot 70 has a pair of side edges 74 which have a groove or a pair of dovetails 76. The square base dovetail 76 holds the vane units 20 in place. Each vane unit 20 is allowed to slide into place with the base 64 received in the slot 70 and the projections 66 received in the grooves 76. The casing 48 in the embodiment shown has the air extraction cavity 56 that underlies the fifth stage 50e and is formed by the slot 70 and the vane units 20. The air extraction cavity 56 draws air through the hole 54 in a base 64 of the vane unit 20 as seen in FIG. 4A.

The vanes in the prior art located above the air extraction cavity 56 were more susceptible to relative motion to the casing as discussed above.

FIG. 5B shows the view of the mounting edge 58, also referred to as a joint surface, of the casing with the slot 70 for the seventh stage 50g. The vane units 20 for the seventh stage 50g have a base 64 with a pair of projections 66 for securing to the casing 48. The base 64 has a relief space 77 between it and the bottom of the slot 70; the relief space 77 aids in the installation and removal. The base 64 does not have a hole through which air passes. A groove 63 for the locking bar 62 as shown.

As indicated above, the first four stages 50a-50d of stator vanes are attached using a ring and blade assembly. FIG. 5C shows a ring segment 78 that is slid out and away from the casing 48. The ring segment 78 receives a plurality of blades 80. (As indicated above, blades that are stationary are typically referred to as stator vanes.) One of the problems with the existing first stage through fourth stage installation is the method about replacement of a blade 80 when it is damaged in that the ring segments 78 need to be hammered out of the slot 70 since it is typical that the ring segment 78 gets bound in the slot 70. In addition to destroying the ring segment 78, there is a risk of damaging other components of the turbine. One of the reasons why the first four stages are assembled using this blade and ring assembly is that these blades are larger and have more forces placed on them and therefore need a stiffer base mount. The invention as described below allows the vane units 20 as improved to be used in the first four stages.

The first four stages use the blade 80 and ring segment 78 method, in conventional compressor as described above, because these vanes which are longer than those of other stages have more force placed on them. With the vane system 22 as described in further detail below, the ring 78 and blades 80 can be replaced by a square base vane unit 20 as shown in FIG. 4A. The use of individual vane units, such as represented by reference numeral 86 as a separation of the ring into multiple vane units allows for reduce cost from that of the ring segment and blade. The use of multiple vane units provides for the pinning together of the vane units 20 provides for a stiffer mount.

Referring back to FIG. 4A, each vane unit 20 has the airfoil vane 46 that extends upwards radially inward towards the shaft 34 of the rotor section 42 when in the compressor section 26 from the base 64. The airfoil vanes 46, stator vanes, are interposed between the rotor blades 44. The base 64 has a projection 66 on each of the two opposing mounting edge 65 to be received by the groove 76 in the side edge 74 of the slot 74 of the casing 48 to retain the vane unit 20 in place, as described above. In addition, the base 64 of each of the vane units 20 has a pair of blind holes 94 machined into the base 64. The blind holes 94 are each located on one of the engaging sides 68 of the base 64, the sides not having the projections 66. A spring pin 96 is inserted into the blind hole 94 in one square base 64 and into the corresponding hole 94 in the base 64 of the adjacent vane unit 20.

While a square base 64 for the vane unit 20 is shown, it is recognized that other shapes may be desired dependent on the number, size and shape of the airfoil. For example, the base 64 can have a rectangular shape or a parallelogram shape.

FIG. 4B shows a plan view of the spring pin 96. The spring pin 96 is a slotted spring pin 142 that is a headless hollow cylindrical tube 144 having a longitudinal slot 146 down the entire length. The ends 148 are chamfered to aid installation. The spring pin 96 is selected to a controlled outside diameter slightly greater than the blind hole 94 in which it will be installed. Compressed as it is installed, the pin 96 applies continuous pressure towards the sides of the hole wall. The pressure provides tension in a radial manner to prevent loosening created by vibration or shock.

In a preferred embodiment, the spring pin 96 is made of Nickel Stainless Steel. The pin has a length of 1 inch, an outer diameter of in a range of 0.385 to 0.395 inches in an uncompressed state, and a wall thickness of 0.077 inches. The chamfer length is a range of 0.016 to 0.095 inches. A spring pin 96 such as described above is sold by Spirol Precision Engineered Products of Danielson, Conn. as 1 inch length ⅜ Corrosion Resistant Steel AISI420.

Figure 6:
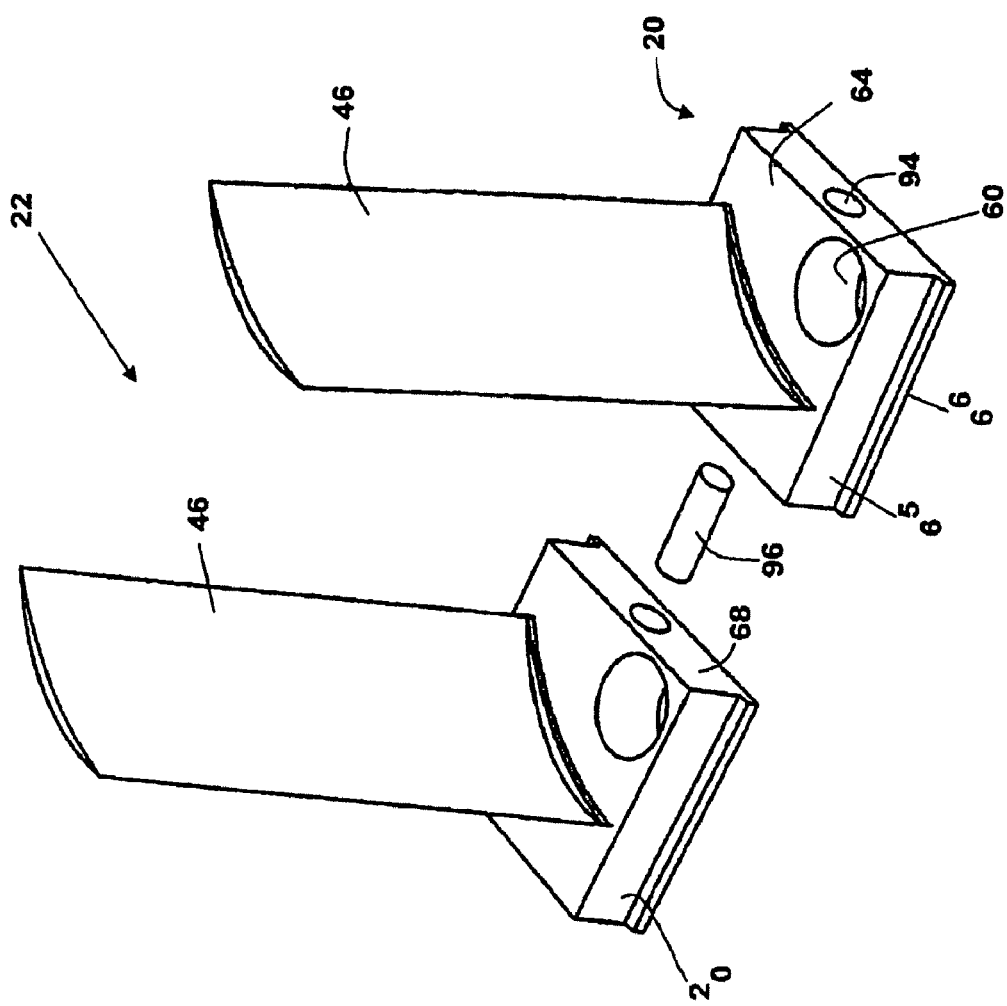
FIG. 6 is an exploded view of a pair of vane units modified according to an embodiment joined with an interposed spring pin.

FIG. 6 shows an exploded view of a pair of vane units 20 with the interposed spring pin 96. In one embodiment, the spring pin 96 has a stiffness to provide enough frictional force to resist motion; or damp vibration (reducing wear) if static friction is overcome. The process of joining vane units 20 by the spring pin 96 is continued until a vane ring 88, as seen in FIG. 2 extends from one edge 58 of the casing 48 as shown in FIG. 2 to the other edge 58 of the casing 48, for example, 180° in a preferred embodiment. The size of the vane ring 88 is dependent on several factors including the curvature of the casing and therefore alternative arc sizes are also possible, depending on the requirements of the particular compressor design. While it is possible to link a vane unit 20 of the lower casing 48 to the adjoining vane unit 20 of the upper casing 48, with the spring pin 96 it is not necessary.

Figure 7:
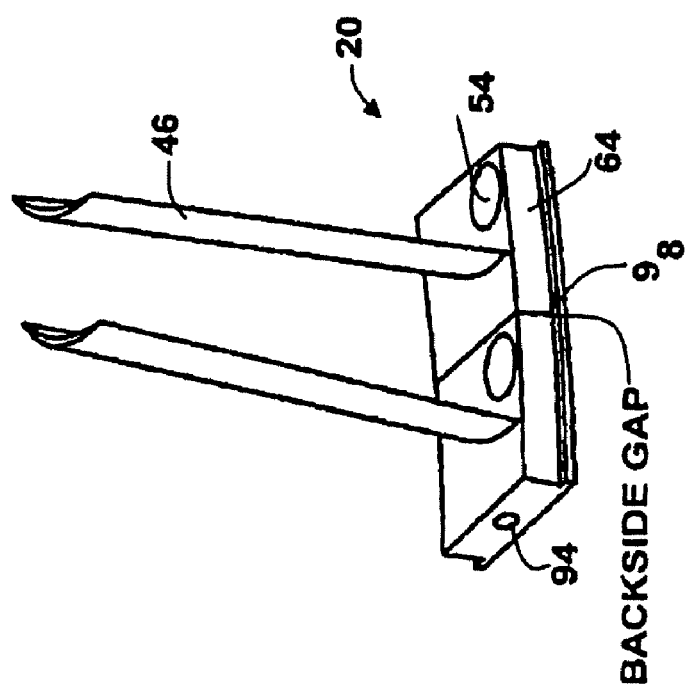
FIG. 7 is side front perspective view of a pair of vane units shown in FIG. 6 assembled together.

FIG. 7 illustrates two vane units 20 for the fifth stage 50e that are attached. The bases 64 are attached by the spring pin 96. While the pinned vane units 20 are shown removed from the casing 48, the vane units 20 are connected in the slot in the casing 48. In that the vane units 20 are for the fifth stage, the base 64 of each unit 20 has a hole 54 through which air is drawn.

A gap 98 is created between the bases 64 of the vane units 20. The gap 98 is created because of the square base 64 of the vane unit 20 in combination with the curvature of the slot 70. While the bases can be tapered, the taper would increase the cost of each vane unit 20 because of machining. Furthermore, it is not desired to have a tight fit because of thermal expansion.

Figure 8:
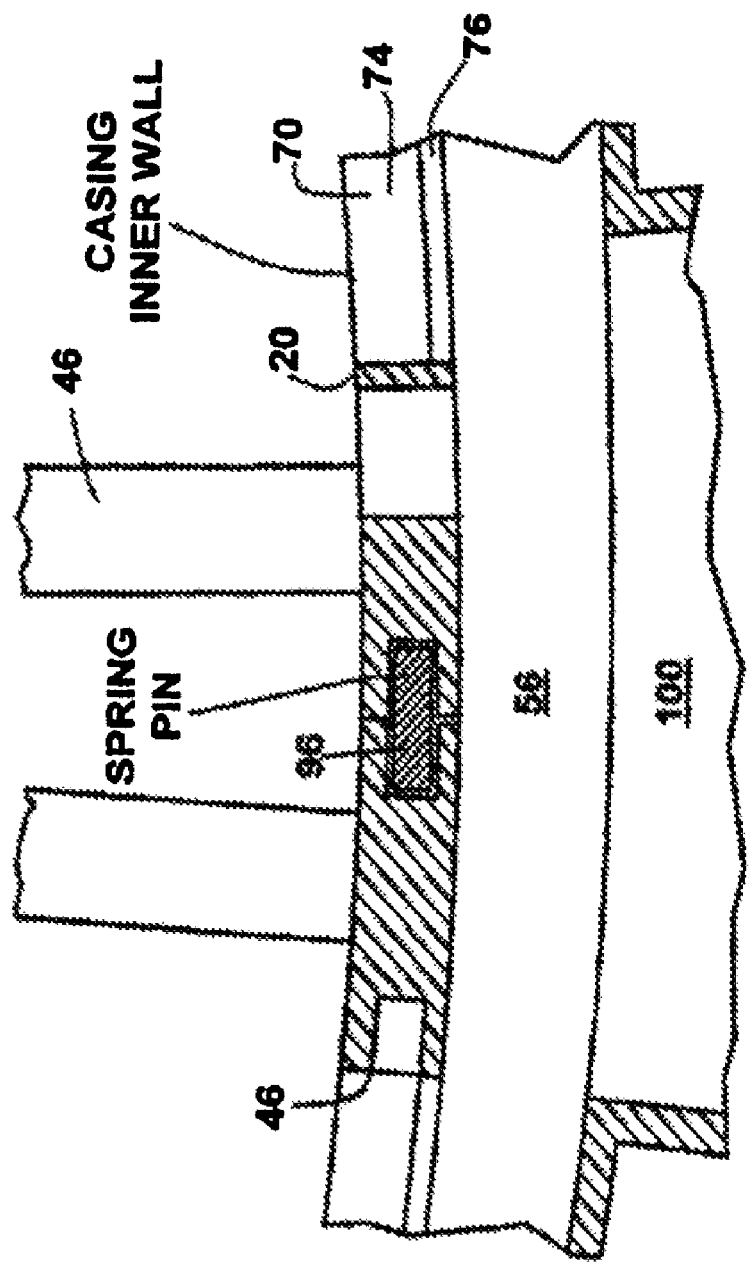
FIG. 8 is a sectional view of a plurality of vane units shown in FIGS. 5 and 6 in the casing.

In installing the vane units 20 with the airfoil blades 46, the first vane unit 20 is positioned halfway between the edges 58 of the casing 48. The first vane unit 20 has the two blind holes 94. The second vane unit 20 has a spring pin 96 that is to be received by one of the blade holes 94 on the first vane unit. FIG. 8 shows a sectional view of a pair of vane units 20 in the slot 70 of the casing 48. The slot 70 has the side edge 74 with the groove 76. The slot 70 includes the air extraction cavity 56 that underlies the vane units 20.

Figure 9:
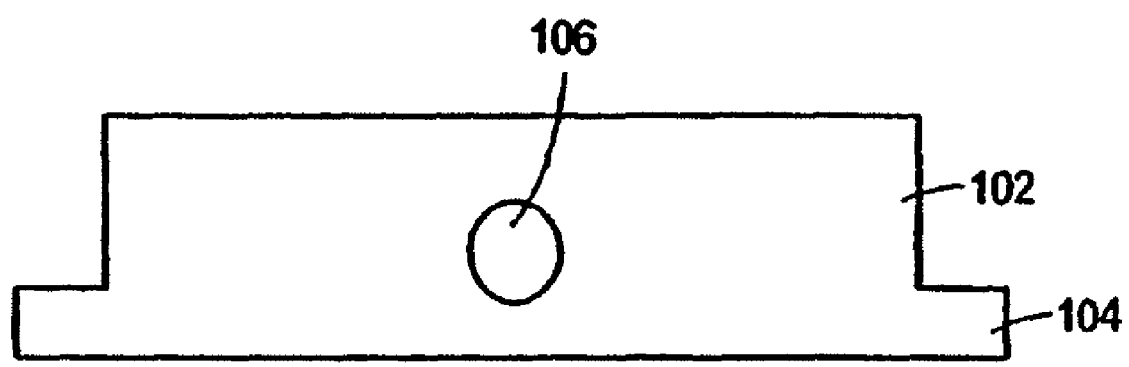
FIG. 9 is a side view of a shim modified according to the invention.

The casing 48 shown is the upper portion and includes an air extraction hole 100 at top dead center (TDC). The vane units 20 are placed in the slot 70 in the casing 48 and are built up from the center of the casing 48. As the vane units 20 are placed into the slot 70, the vane system 22 has a plurality of shims 102, which are interposed between vane units 20, to space the vane units 20 such that the last vane unit's engaging edge 68 is within an allowable clearance with the edge 58 of the casing 48. In the prior art, the shims 102 as seen in FIG. 9 have a pair of tabs 104 which are received in the groove 76 on the side edge 74 of the slot 70 to retain the shim in position.

Figure 10A:
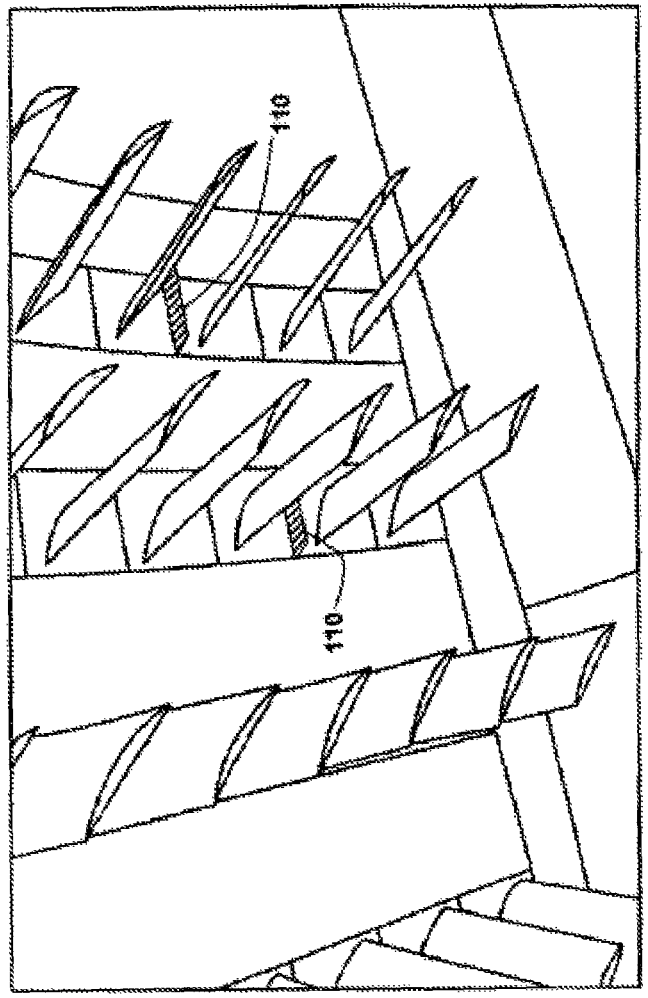
FIG. 10A is a side view of the casing showing the problem of shims protruding in a previously known compressor construction.
Figure 10B:
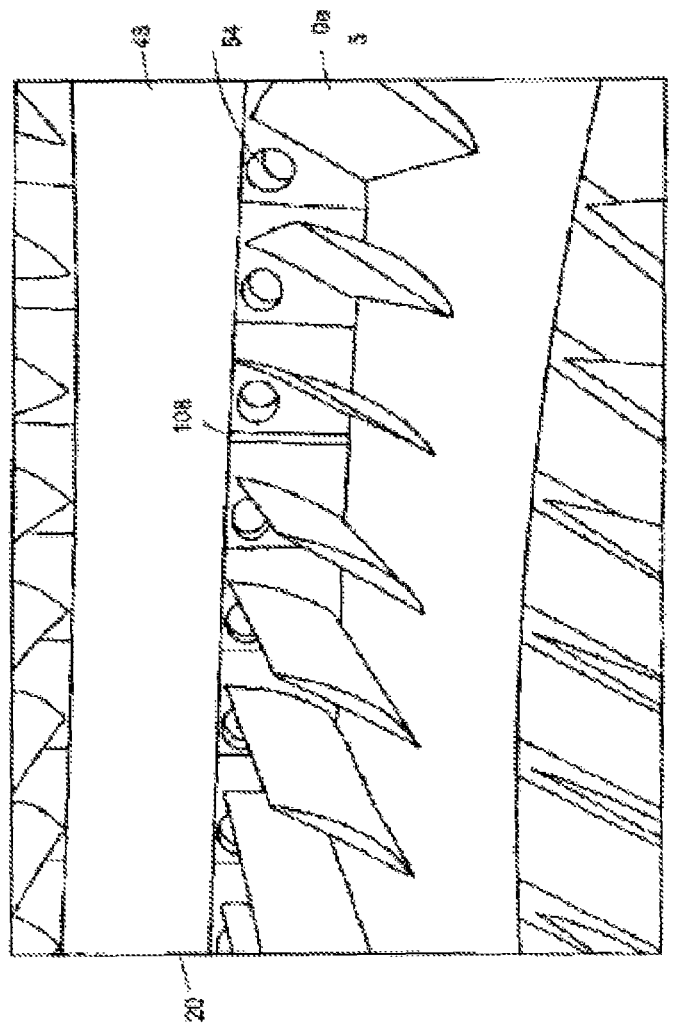
FIG. 10B is a front view of the fifth stage in the previously known casing with a missing shim problem.
Figure 11:
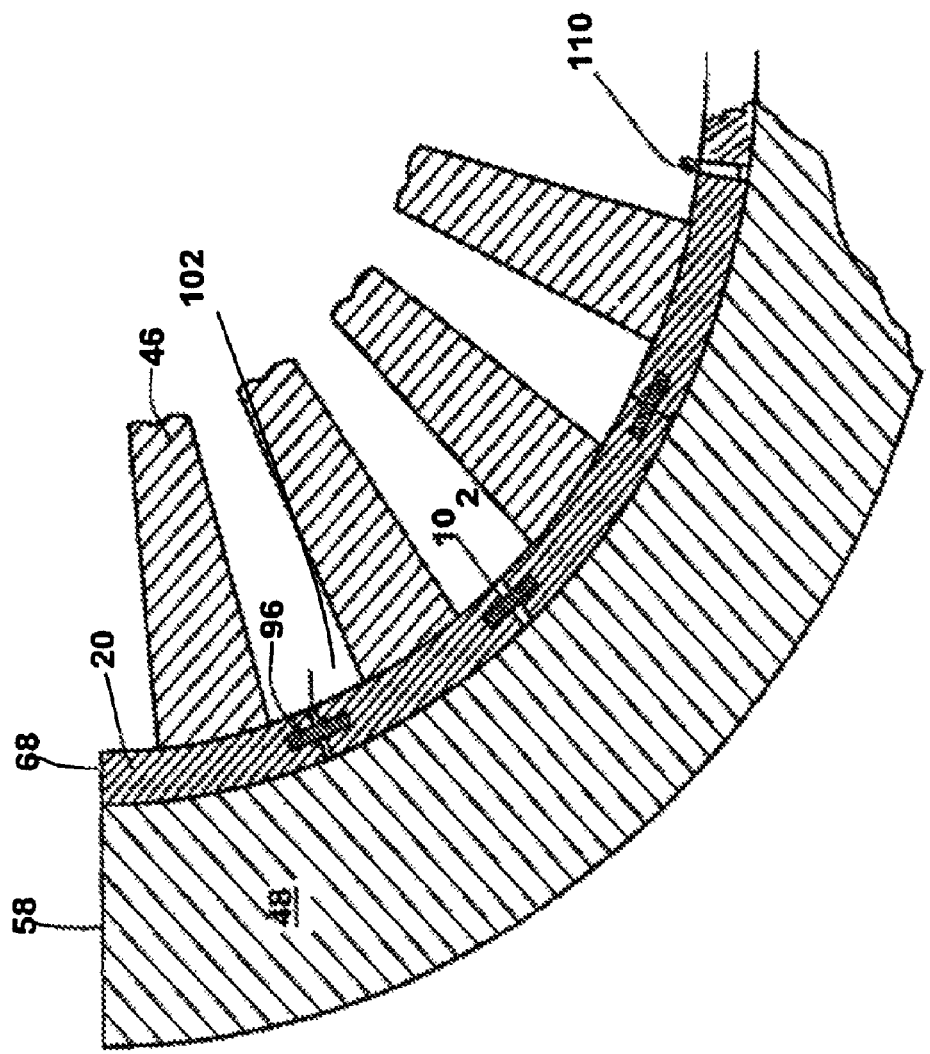
FIG. 11 is a sectional view of the casing similar to FIG. 10A but showing a modified embodiment of vane assembly and shims.

In the prior art, with the vane units and the shims moving because of aerodynamic forces on the airfoils, the tabs 104 wear away and the shims 102 can protrude into the flow path as seen in FIG. 10A. The example shown of the protruding shim 110 does not exist in the vane system 22 of the invention which the remainder of FIG. 11 shows. The protruding shims 110 can cause rotating blade stimulation and flow blockage. In addition, the shims can work their way totally out of the slot 70 in the casing 48 and enter into the air stream and cause blade foreign object damage (FOD) on downstream blades and vanes. FIG. 10B shows a gap 108 between two airfoil blades 46 because of loss of shims and movement of vane units.

Referring to FIG. 11, a sectional view of the casing 48 with the vane system 22 in proximity to the edge 58 of the casing 48 is shown. Interposed between the last three vane units 20 are shims 102 secured by the pin 96 between the adjacent vane units 22. The shims 102 space the bases 64 of the vane units 20 so that the last vane unit's 20 engaging edge 68 is within an allowable clearance with the edge 58 of the casing 48.

Figure 12:
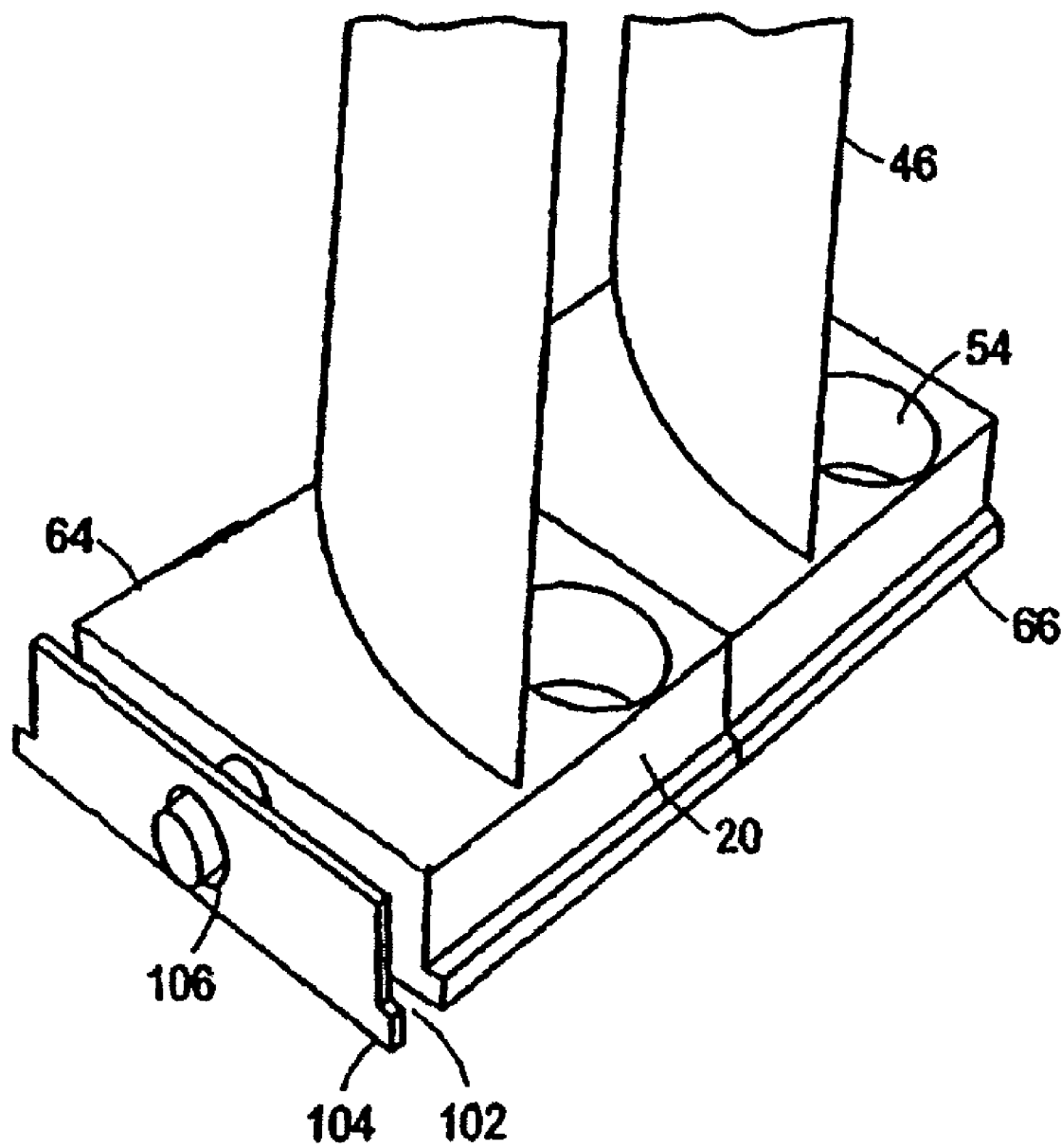
FIG. 12 is a side perspective view of a shim carried by a pin adjacent to a pair of vane units according an embodiment of the invention.

FIG. 12 shows a side perspective view of a shim 102 carried by the pin 96 adjacent to a pair of vane units 20. The shim 102 has a hole 106 through which the spring pin 96 extends from the blind hole 94 of one of the bases to the blind hole 94 of the adjacent base. The spring pin 96 prevents the shim 102 from moving out of position and possibly entering the air stream and hitting a blade or vane down stream.

It is recognized that while a pin, a spring pin 96, is shown and described above, between every adjacent vane unit 20, that the lack of a spring pin 96 at sporadic locations will not substantially reduce the performance. For example, in a preferred embodiment there is no spring pin spanning between the two casing portions 48.

In addition, while the above has shown vane units 20 each having a single airfoil or blade, it is recognized that a unit may have a plurality of airfoils. The number of airfoils in a unit is dependent on the size and the shape of the airfoil and the curvature of the casing 48. While not limited to this number, generally 5 to 7 airfoils to a single base is the maximum. It is also recognized that increasing the number of airfoils on a single base increases the overall cost of the unit for various reasons including machining, forging, investment casting, or welding the unit. Furthermore, the multiple airfoils increase the difficulty of accessing all sides of the airfoils on one unit. In addition, the curvature of the base adds to the cost.

The vane system 22 is described with respect to the compressor section 26 of the gas turbine 24. The compressor section 26 operates in a temperature range of ambient temperature to approximately 600° F.

The turbine section 30, also referred to as the hot section, operates and can operate at temperatures in excess of 800° F. and higher. Spring pins will soften and will not function at the high temperature of the turbine section. In addition, there needs to be some movement to allow for thermal expansion. However, slip pins can be used to link several vane units together to allow movement between adjacent pinned units.

Figure 13:
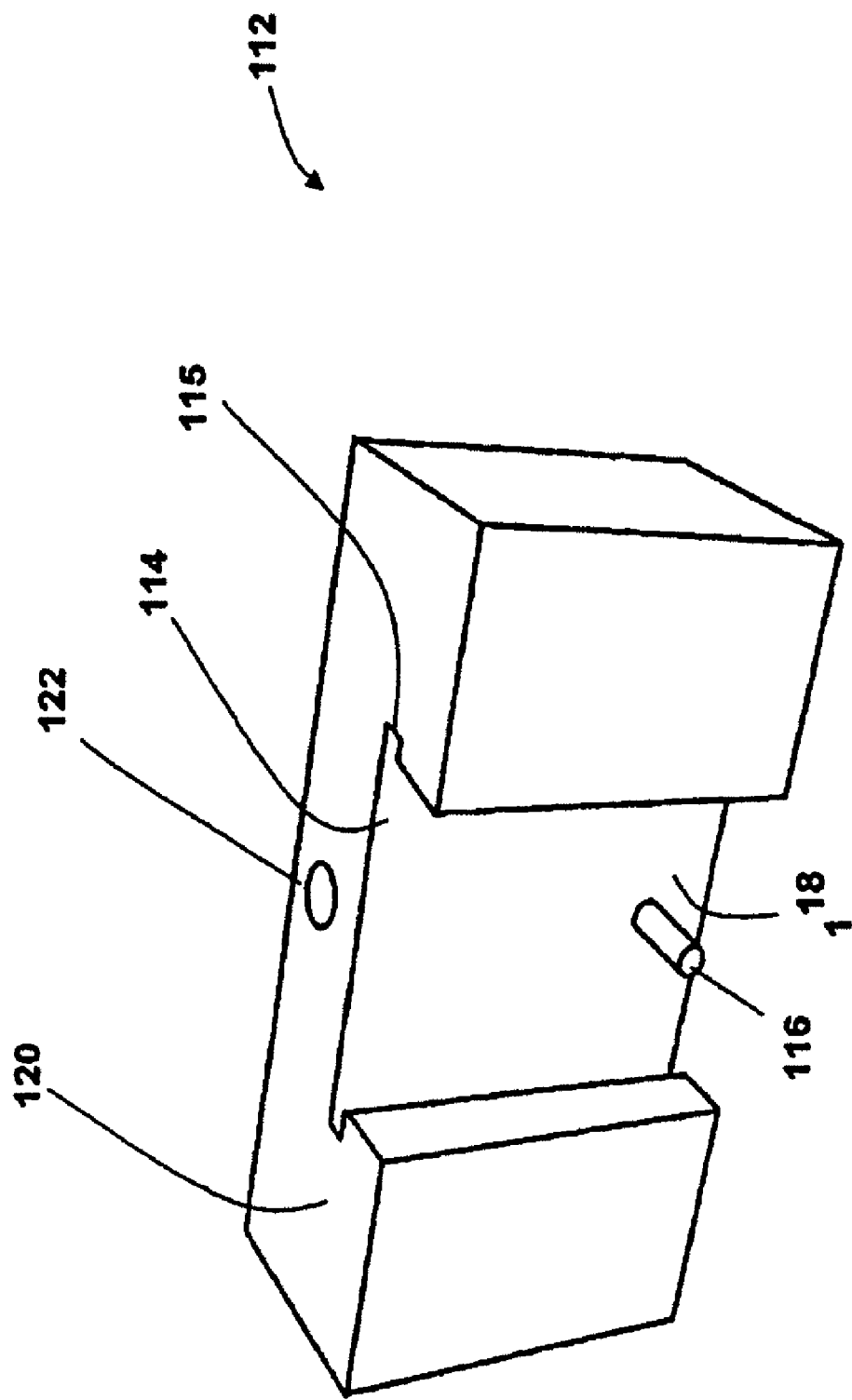
FIG. 13 is a side perspective view of a drill fixture tool embodiment according to the invention.

In order to install the vane system 22 with the vane units 20 and the spring pin 96, existing vane units need to have a hole 94 located on either side, the engaging edge 68, of the base 64, that is the edge that does not have the projection 66. FIG. 13 shows a fixture 112 for drilling pin holes 94 in the base 64 of the vane unit 20. The channel 114 has a pair of grooves 115 similar to the grooves 76 of the side edges 74 and the slot 70 as seen in FIG. 5A. The groove 115 receives the projection 66 of the base 64. The groove 115 is set at an angle such that when the fixture 112 is placed on a machining device, the hole placed in the base 64 of the vane unit 20 is of the proper angle for the curvature of the slot 70 in the casing 48. For example, in one embodiment, the casing receives eighty two (82) vane units 20 between the two halves. Each hole is drilled at 2.195° incline relative to being parallel to the top and bottom base 64 in this preferred embodiment. The fixture 112 has a channel 114 that receives the base 64 of the vane unit 20.

A pin 116 projects from the base 118 of the channel 114 to position the base 64 of the stator vane unit 20 relative to the top 120 of the fixture 112. The positioning of the hole on the base is done by alignment on a milling machine of the drill bit with the hole 122 in the fixture 112. The head of the milling machine is translated a specific distance such as an inch from that alignment hole 122 to position the drill bit for drilling the hole in the base 64.

The installation of the vane units 20 in the casing 48 can be done with the rotor section 42 in place in the compressor section 26. In order to do this, the installer needs to reach the vane units 20.

Figure 14A:
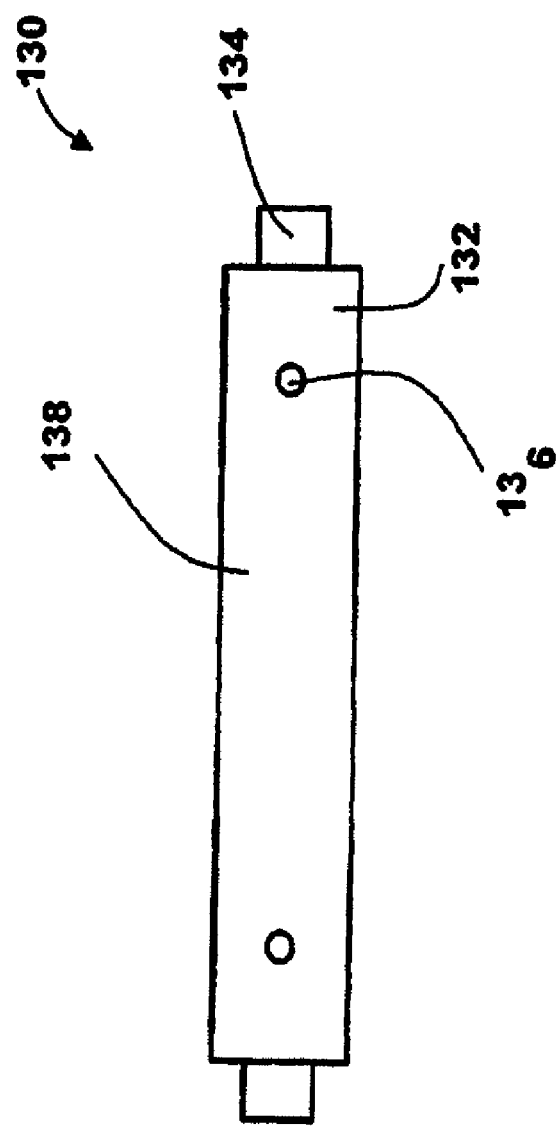
FIG. 14A is a front view of an assembly tool embodiment according to the invention.
Figure 14B:
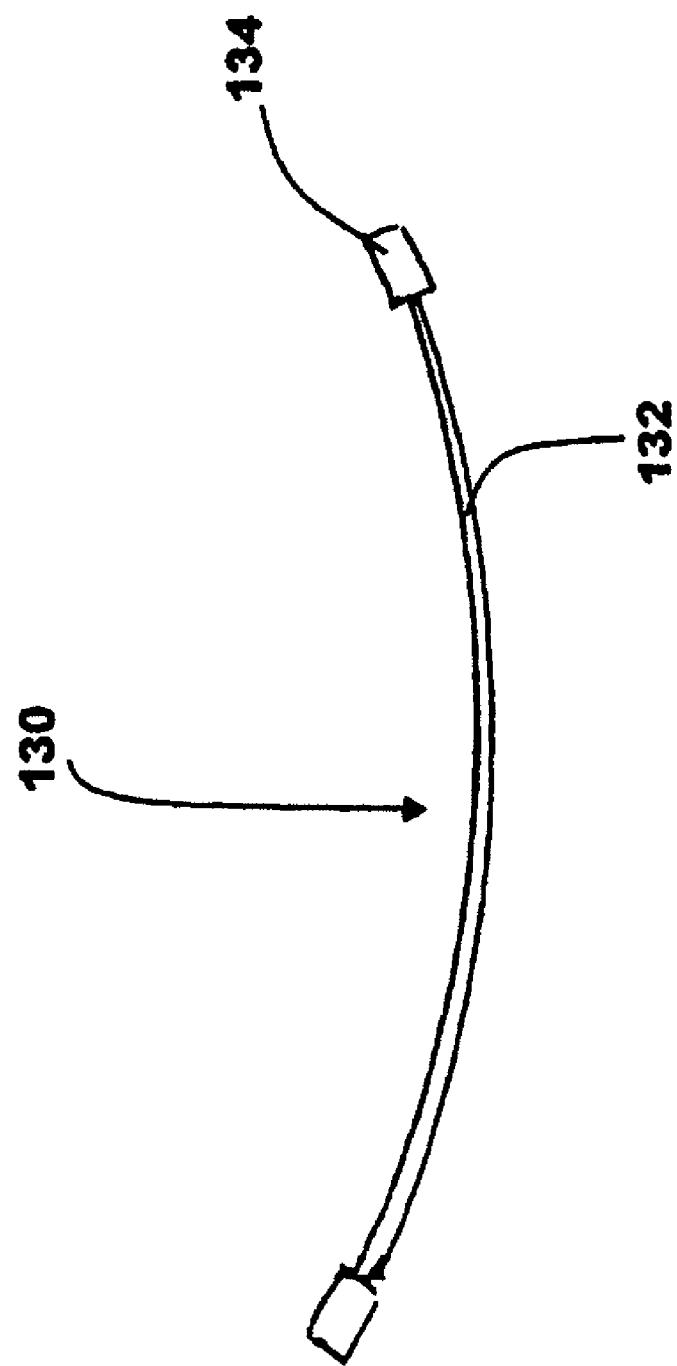
FIG. 14B is a side view of the assembly tool shown in FIG. 14A.

FIG. 14A shows the front view of an assembly tool 130 and FIG. 14B shows a side view of the tool 130 that can be used in the installation of the vane unit 20. The vane units 20 are placed into the slot 70 in the casing 48 by sliding the first vane unit 20 down so that the first vane unit 20 is located at the bottom dead center in the casing 48 such that the unit is equally distant from the edges 68 of the casing. A plurality of the assembly tools 130 are slid in such that the lowest one engages the vane unit 20 from one side.

The assembly tool 130 has a main portion 132 that has a curvature similar to the slot 70 in the casing 48. The main portion 132 of the assembly tool 130 has a width and thickness such that it extends between the two grooves 76 in the side edges 74 of the slot 70. Located at each end of the main portion 132 is a contact block 134 which has a greater thickness. The contact block 134 has a width that when received by the slot 70 in the casing 48 extends approximately to the side edges 74 of the slot 70, that is of a width approximate to the base 64 of the vane unit 20. The assembly tools 130 can be linked together using a cabling that extends between a hole 136 located in the main portion 132 of the assembly tool 130.

A second vane unit 20 is slid into the slot 70 in the casing 48 on the side not having the assembly tools 130. Additional assembly tools 130 are used to move the second vane unit 20 into engagement with the first vane unit 20. The assembly tool 130 has a series of lines or scribe lines 138 such that the assembly tool 130 that extends from the slot 70 above the edge 58 of the casing 48 can be used to determine if the second vane unit 20 is in full engagement with the first vane unit 20. When the second vane unit 20 is initially slid in, the spring pin 96 rests against the base 64 of the first vane unit 20, but does not enter the blind hole 94. The installer can look at the scribe lines 138 on the assembly tool 130 and determine to what line 138 on the assembly tool 130 the edge 58 of the casing 48 must be aligned to by driving the assembly tool 130 in order to install the second vane unit 20 properly.

The assembly tools 130 are then removed from the slot 70 and the next vane unit 20 is slid into the slot 70. The assembly tools 130 are then reinstalled to position the vane unit 20.

When the vane unit 20 approaches the edge 58 of the casing 48, the last several vane units 20 are slid into the slot 70 in the casing 48 without spring pins 96 interposed between the vane units 20. It is determined how many shims 102 are required to result in the engaging edge 68 of the base 64 of the last vane unit 20 being within an allowable clearance with the edge 58 of the casing 48. After the proper number of shims 102 are determined by a "dry fitting," the vane units 20 are removed from the slot 70 in the casing 48 and are installed using spring pins 96 that in addition to holding the vane units 20 secure, retain the interposed shims 102 such as shown in FIG. 11. The shims 102 have a hole 106 through which the spring pin 96 passes. The tabs 104 of the shims 102 are received in the groove 76 on the side edge 74 of the slot 70 in the casing 48.

When the first side is completed by building up the vane units 20 to the edge 58 of the casing 48, the plurality of assembly tools 130 that were slid into the other side are removed and the vane units 20 are built up towards the other edge 58 of the casing 48.

In a preferred embodiment, the assembly tool 130 has a length of 12 inches and a width of 2.6 inches excluding the contact blocks 134. The main portion 130 has a thickness of an eighth (⅛) of an inch and a radius of curvature of 32 inches. The contact blocks 134, which are welded onto the main portion 132 of the tool 130, each have a length of 2 inches and a height and depth of a quarter (¼) of an inch.

The two holes 136 in the main portion 132 of the assembly tool 130 have a diameter of ⅝ of an inch. The center of each of the holes 136 is spaced from the main portion 132 and contact block 134 interface by 2 inches. The holes 136 are for securing assembly tools 130 together with cable or assisting for retrieving the assembly tools. It is recognized that the size of the tool 130 is dependent on various factors such as the size of the slot 70 and the curvature of the casing 48.

It is recognized that the assembly tool 130 is designed to fit the respective casing and slot that would be receiving the respective vane unit 20 during installation. For example, the assembly tool dimensions given above are for a GE 7EA gas turbine engine.

Figure 16A:
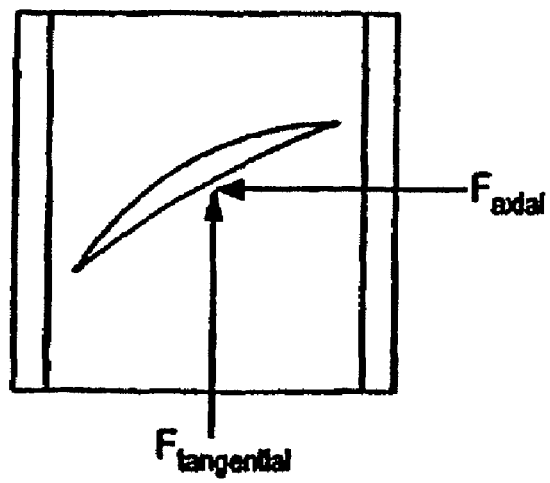
FIGS. 16A-16C are top, front, and side views of a vane unit embodiment according to the invention showing the reaction forces.
Figures 16B, 16C:
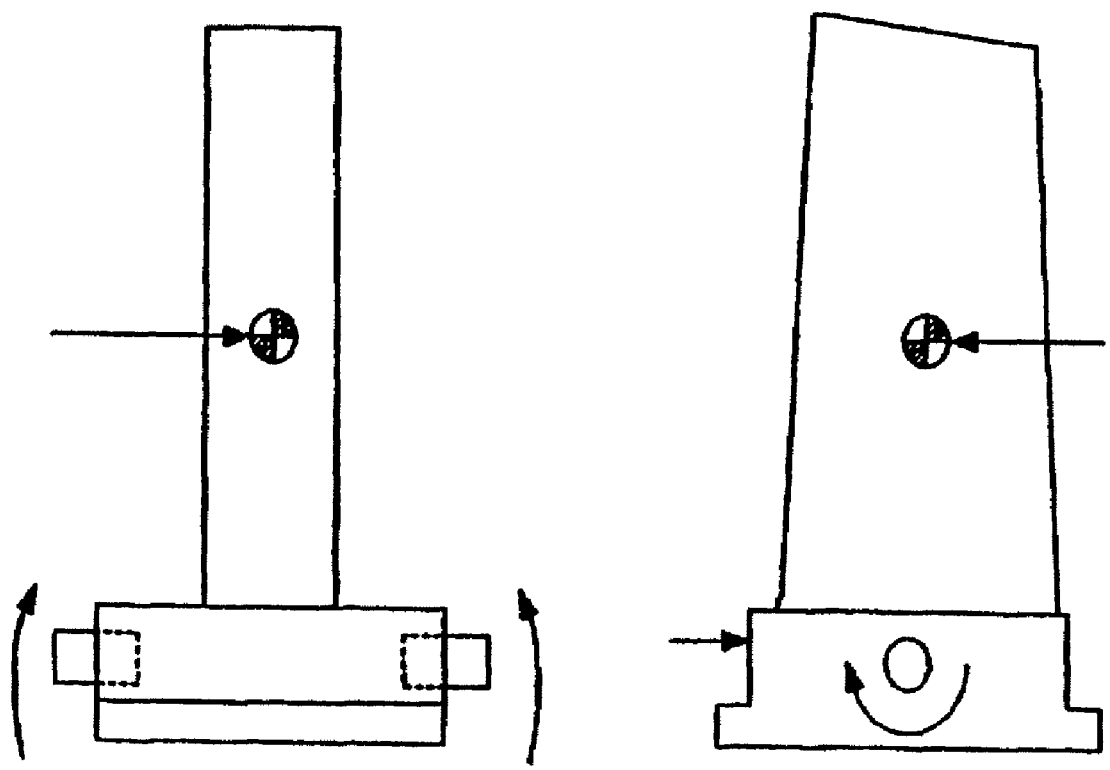
Figure 17A:
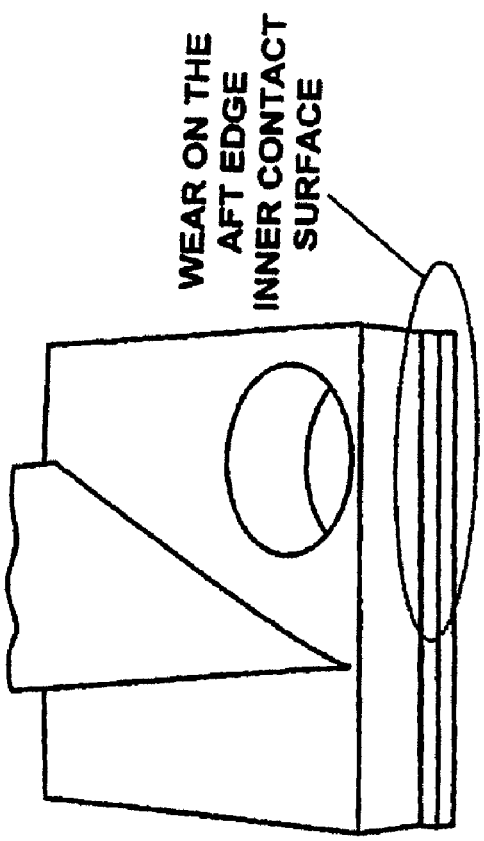

FIGS. 15A-15C show the reaction forces on the vane unit of the prior art with the forces including the aerodynamic loading and the interaction between the vane unit and casing. FIGS. 16A-16C show the reaction forces on an embodiment of the vane unit 20 of the invention with the forces including the air loading, the interaction between the vane unit 20 and the casing 48, and the spring pin 96 interaction.

The embodiments of a vane unit according to the invention can be used to retrofit existing gas turbines that have square base compressor vanes. The retrofit will solve the wear problem in the existing gas turbines The spring pin 96 is used for ease of modification and low cost. It is recognized that other mechanisms such as bolting, welding, brazing, can be used.

By use of the vane system with embodiments of the vane units 20, axial and circumferential tip movement of the vane 46, which possibly could result in interference with a blade 44 on the rotor section 42, is reduced. The measurement of movement of the free edge of the airfoil went from 0.063 inches to approximately zero (0). There is no free movement of the vane unit 20.

By use of the spring pin 96 between the bases 64 of embodiments of the vane unit 20, the vane unit 20 forms a rigid unit of plurality of vane units wherein the edges of the projection 66 are not the engaging surface that gets worn away. But rather, the centered portion of the projection 66 is the portion that is in firm contact within the groove 76 in the side edge 74 of the slot 70. Therefore there is no movement between the bases 64 of the vane unit 20 and the casing.

In addition, with the use of this spring pin 96 extending through the shim 102, the migration of the shim 102 into the flow stream is prevented. As indicated above, the existing gas turbine 24 embodiments use the vane units 20 with projections 66 from the base 64 received in grooves 76 in the side edges 74 of the slot 70. Therefore, the vane unit system 22 with the vane unit 20 and spring pin 96 does not require new vane units unit stator blades 46. The vane units are removed and modified with the blind hole 94 to receive the pin 96. The task of determining if the set of blades are good operationally or have the proper tip clearance has already been done when the blades were initially produced for this compressor section 26 of the gas turbine 24.

By pinning the vane unit 20 with the spring pin 96 and the vane system 22 together, the vane units are held simply so that any previous wear prior to use of the invention on the forward edge and aft edge of the projection 66 is not of a concern. Therefore, the owner of the gas turbine 24 is not required to machine out the slot 70 in the casing 48 wherein the operator needs to take the gas turbine out of commission while the slot is machined out and a patch ring is installed having the slot 76 within it.

The use of the vane system 22 allows the overhaul of the current gas turbines 24 to be within the normal time constraints and not affect others' work.

While the above disclosure describes the retrofitting of an existing gas turbine 24, it is recognized that the main system may be used on new gas turbine designs. For example, FIG. 5C shows the configuration with the ring and blade used for the first four stages 50a-50d of current gas turbine designs. The reason for this different design for the first four stages is because the first four stages have larger airfoils or vanes and therefore more aerodynamic force and thus require more stability. With the vane system 22, the individual vane units 20 are linked together and the reason for having a different design for stages 1-4 is not required. Therefore, the vane system 22 as described above may preferably be used in the first four stages, but other arrangements may be possible in other stages where different forces are acting. This will result in lower cost. The vane unit 20 can have an airfoil 46 secured to the base 64 or a separate blade unit 80 attached to the ring segment unit or vane base.

As indicated above, the vane system 22 can be formed by pinning together vane units 20 with a pin using a prior art vane unit 20 with the addition of a pair of blind holes 94. It is recognized that other methods of coupling vane units 20 to each other can be done. For example, the vane unit can have a projection on one engaging edge that is receivable in a hole in an adjacent engaging edge. Another alternative is an adhesive pad that mounts between and to the two adjacent engaging edges. Other components and apparatus are a tongue and groove arrangement.

Figure 18:
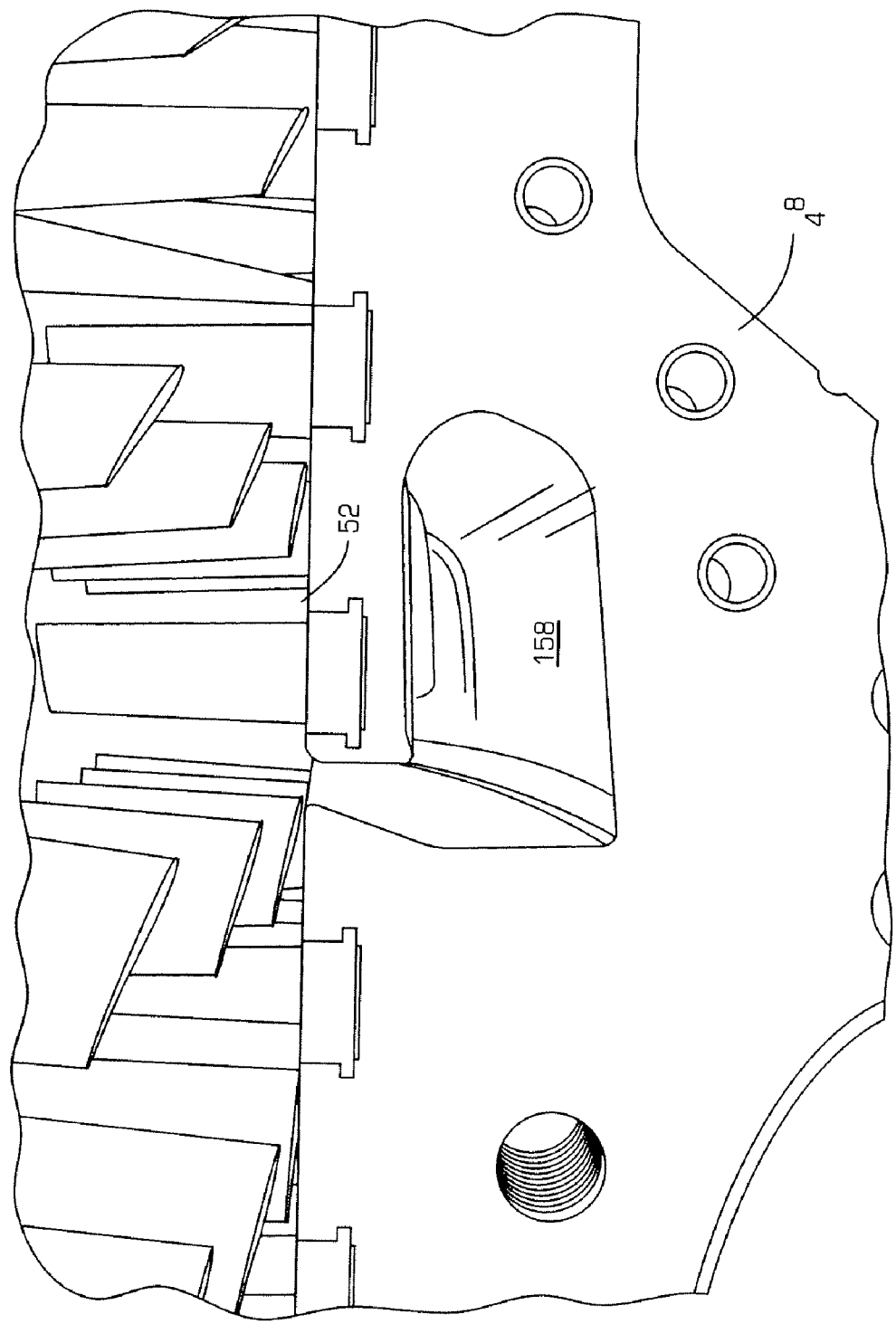
FIG. 18 is a side view of an alternative compressor.

The above discusses the issues of where the stator vane units 20 become loose or shims 102 work their way loose and into the air flow stream. The vane unit system according to the invention in addition can solve additional problems on the compressor section 26 of the gas turbine 24. As seen in FIG. 18, certain compressors 156 have an air extraction slot 158 that has a 360.degree. opening onto the inner surface 52 of the casing 48. This results in a cantilever portion of the casing retaining a stage of stator vanes such as the tenth stage in a GE Frame 5 Gas Turbine. The cantilever portion has a tendency to crack away from the remainder of the casing and has a potential to enter the air stream and destroy downstream blades and vanes.

Figure 19:
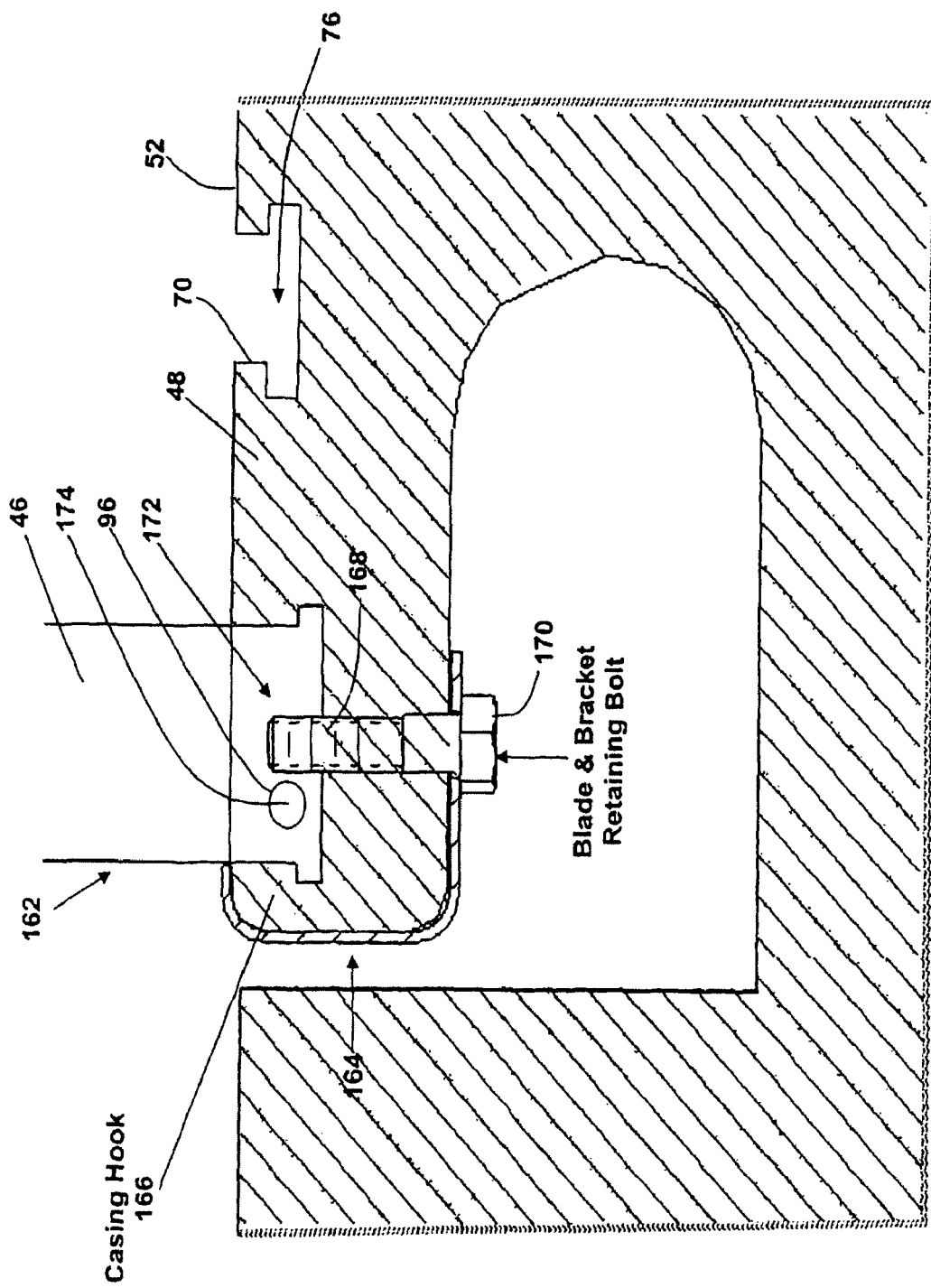
FIG. 19 is a side view of a portion of a casing with an alternative embodiment of a vane system according to the invention.

The tenth stage of the compressor with the air extraction slot is shown in FIGS. 18 and 19. The vane system according to the invention has a plurality of vane units 162, pins and at least one hook-capturing bracket 164. The hook-capturing bracket 164 captures the cracked casing hook 166 at the edges and prevents further crack propagation.

The conventional method was to remove the rotor 42 from the casing 48 and machine out a casing hook 166. A new ring is installed and machined to have the slot 70 with groove 76.

FIG. 19 shows a casing 48 with a horizontal joint or edge 58. The vane unit 162 that is adjacent to the edge 58 in addition has a blind hole 174 for a pin for connecting to the remaining vane units 162. The base 172 of the vane unit 162 has a threaded hole 168 through its bottom. The bracket 164 is used to secure the casing hook portion 166 of the casing 48. A bolt 170 extends through the bracket 164, the casing 48 and into the threaded hole 168 of the vane unit 162.

Figure 20:
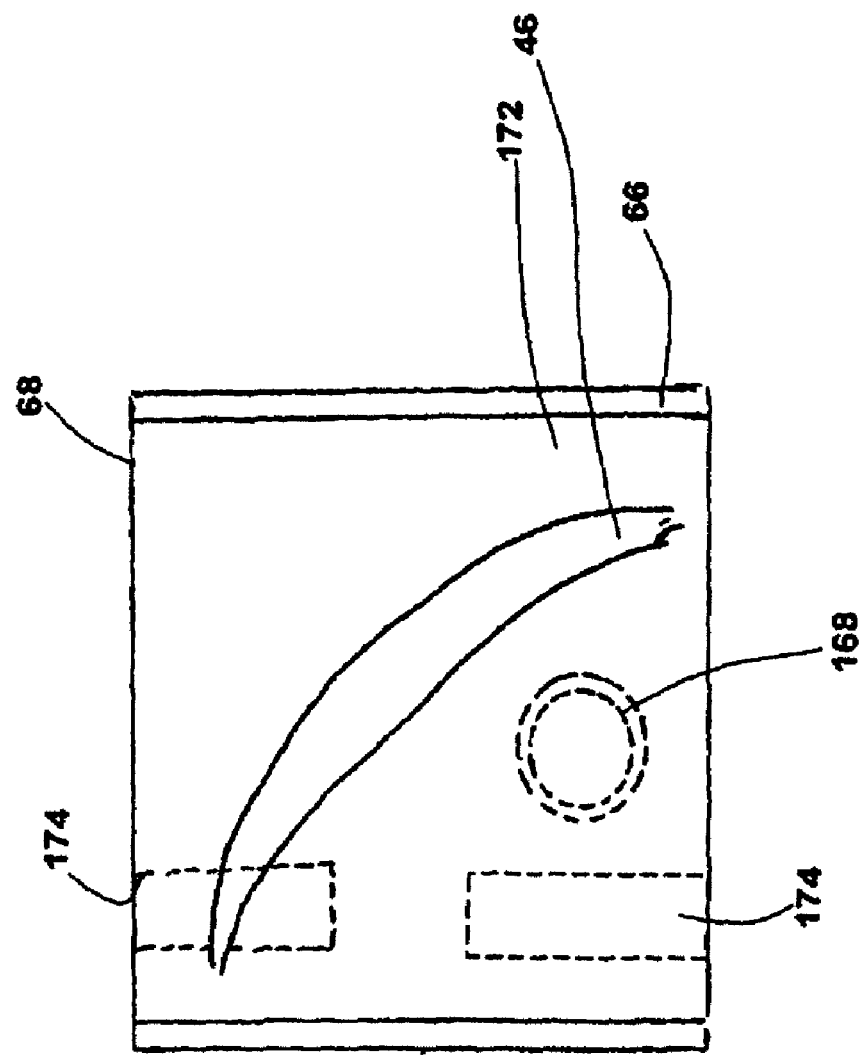
FIG. 20 is a top view of vane unit embodiment according to the invention with holes shown in hidden line.

FIG. 20 is a top view of the vane unit 162. The base 64 of the vane unit 162 shows the pair of blind holes 174 in hidden line and the threaded hole 168 for the retaining bolt 170 is shown in this embodiment, the blind holes 174 are shifted from the centerline. It is recognized that the location of the blind holes 174 can be shifted. While the embodiment above describes use of two brackets 164, it is recognized that additional brackets 164 can be included. The upper casing 48 which is separated from the rotor 42, allows placement of multiple brackets. With respect to the lower casing 48, if the rotor 42 is removed, additional brackets can be installed. The bracket 164 is bent to secure the bolt 170.

FIG. 21 shows an exploded view of a pair of modified embodiments 180 for vane units 20. Each modified vane unit 180 has a groove 182 on one engaging edge 68 and a tongue 184 on the other engaging edge 68. The tongue 184 of one vane unit is received by the groove 182 of the adjacent vane unit 180 to form the vane units 180 together in a ring unit. This provides enough frictional force to resist motion; or damp vibration (reducing wear) if static friction is overcome. The process of joining vane units 180 continues until a vane ring extends from one edge 58 of the casing 48 to the other edge 58 of the casing 48.

In addition to spring pins, other types of pins can be used. Other potential pins include a coiled spring pin, an interference fit pin, such as a groove pin. With an interference fit pin such as a grooved pin, however, the vanes could not be used again with the same sized pin because the hole in the base would have been distorted and gouged from removing the pin. Likewise, a coiled compression spring could be placed in the base holes and compressed as the bases are slid together. This would provide vibration damping and limited movement of the base in the casing groove. All these devices could work to varying degrees of success relative to the slotted spring pin.

The claims should not be read as limited to the described order or elements unless stated to that effect. Therefore, all embodiments that come within the scope and spirit of the following claims and equivalents thereto are claimed as the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for modifying a set of compressor stator vane units having a base, said compressor having a casing with a slot receiving said base for an industrial gas turbine to avoid wear and reduce chatter, comprising:
    forming a hole in a center portion of a face edge of the base of a vane unit;
    inserting a pin into said hole; and
    positioning a face edge of an adjacent unit towards said vane unit.

2. The method of claim 1 wherein positioning comprises inserting a contact block adjacent said adjacent unit.

3. The method of claim 2 wherein said inserting a contact block comprises sliding an assembly tool in said slot.

4. The method of claim 1 wherein said method further comprises connecting adjacent vane units.

5. The method of claim 4 wherein said connecting comprises coupling said adjacent vane to said base of said vane unit at said face edge.

6. The method of claim 5 wherein said coupling comprises inserting a projection on one said face edge into a cavity in the face edge on the adjacent vane unit.

7. The method of claim 4 including forming a hole in said face edge of said adjacent unit.

8. The method of claim 7 including positioning a shim adjacent said face edge of said vane unit before said positioning step.

9. A method for modifying a set of compressor stator vane units having a base, said compressor having a casing with a slot receiving said base for an industrial gas turbine to avoid wear and reduce chatter, comprising:
    forming a hole in a center portion of a face edge of a base of a vane unit;
    inserting a pin into said hole;
    forming a hole in said face edge of said adjacent unit;
    inserting the pin into said hole in said face edge of said adjacent unit;
    positioning a face edge of an adjacent unit towards said vane unit; and
    connecting adjacent vane units.

* * * * *